US012538084B1

(12) United States Patent
Telfort et al.

(10) Patent No.: US 12,538,084 B1
(45) Date of Patent: Jan. 27, 2026

(54) SYSTEMS AND METHODS FOR GENERATING AN EQUAL-LOUDNESS CONTOUR RESPONSE USING AN AURICULAR DEVICE

(71) Applicant: Masimo Corporation, Irvine, CA (US)

(72) Inventors: Valery G. Telfort, Irvine, CA (US); Luke John Campbell, Brunswick (AU)

(73) Assignee: Masimo Corporation, Irvine, CA (US)

( * ) Notice: Subject to any disclaimer, the term of this patent is extended or adjusted under 35 U.S.C. 154(b) by 160 days.

(21) Appl. No.: 18/433,135

(22) Filed: Feb. 5, 2024

Related U.S. Application Data

(60) Provisional application No. 63/483,444, filed on Feb. 6, 2023.

(51) Int. Cl.
*H04R 25/00* (2006.01)
(52) U.S. Cl.
CPC ......... *H04R 25/505* (2013.01); *H04R 25/604* (2013.01); *H04R 2225/41* (2013.01)
(58) Field of Classification Search
CPC . H04R 25/505; H04R 25/604; H04R 2225/41
See application file for complete search history.

(56) References Cited

U.S. PATENT DOCUMENTS

| | | |
|---|---|---|
| 4,960,128 A | 10/1990 | Gordon et al. |
| 4,964,408 A | 10/1990 | Hink et al. |
| 5,319,355 A | 6/1994 | Russek |
| 5,337,744 A | 8/1994 | Branigan |
| 5,341,805 A | 8/1994 | Stavridi et al. |
| 5,377,676 A | 1/1995 | Vari et al. |
| 5,431,170 A | 7/1995 | Mathews |
| 5,436,499 A | 7/1995 | Namavar et al. |
| 5,456,252 A | 10/1995 | Vari et al. |
| 5,479,934 A | 1/1996 | Imran |
| 5,482,036 A | 1/1996 | Diab et al. |
| 5,494,043 A | 2/1996 | O'Sullivan et al. |
| 5,533,511 A | 7/1996 | Kaspari et al. |
| 5,590,649 A | 1/1997 | Caro et al. |
| 5,602,924 A | 2/1997 | Durand et al. |
| 5,638,816 A | 6/1997 | Kiani-Azarbayjany et al. |
| 5,638,818 A | 6/1997 | Diab et al. |
| 5,645,440 A | 7/1997 | Tobler et al. |
| 5,671,914 A | 9/1997 | Kalkhoran et al. |
| 5,726,440 A | 3/1998 | Kalkhoran et al. |

(Continued)

*Primary Examiner* — Tuan D Nguyen
(74) *Attorney, Agent, or Firm* — Knobbe, Martens, Olson & Bear, LLP

(57) ABSTRACT

A system may include a storage device, configured to store computer-executable instructions. A system may include an ear-bud configured to be positioned within an ear canal of a user, the ear-bud comprising: a speaker, a microphone; and one or more processors in communication with the storage device, wherein the computer-executable instructions, when executed by the one or more processors, cause the one or more processors to: obtain a user hearing profile, obtain an equal-loudness hearing profile, receive audio data from the microphone, and generate a second audio data based on a first sound-pressure level, a second sound-pressure level, a first frequency; and cause the speaker to emit the second audio data within the ear canal of the user, such that the user perceives the audio data as if the user has normal hearing.

20 Claims, 12 Drawing Sheets

(56) References Cited

U.S. PATENT DOCUMENTS

| | | |
|---|---|---|
| D393,830 S | 4/1998 | Tobler et al. |
| 5,743,262 A | 4/1998 | Lepper, Jr. et al. |
| 5,747,806 A | 5/1998 | Khalil et al. |
| 5,750,994 A | 5/1998 | Schlager |
| 5,758,644 A | 6/1998 | Diab et al. |
| 5,760,910 A | 6/1998 | Lepper, Jr. et al. |
| 5,890,929 A | 4/1999 | Mills et al. |
| 5,919,134 A | 7/1999 | Diab |
| 5,987,343 A | 11/1999 | Kinast |
| 5,997,343 A | 12/1999 | Mills et al. |
| 6,002,952 A | 12/1999 | Diab et al. |
| 6,010,937 A | 1/2000 | Karam et al. |
| 6,027,452 A | 2/2000 | Flaherty et al. |
| 6,040,578 A | 3/2000 | Malin et al. |
| 6,066,204 A | 5/2000 | Haven |
| 6,115,673 A | 9/2000 | Malin et al. |
| 6,124,597 A | 9/2000 | Shehada et al. |
| 6,128,521 A | 10/2000 | Marro et al. |
| 6,129,675 A | 10/2000 | Jay |
| 6,144,868 A | 11/2000 | Parker |
| 6,152,754 A | 11/2000 | Gerhardt et al. |
| 6,184,521 B1 | 2/2001 | Coffin, IV et al. |
| 6,232,609 B1 | 5/2001 | Snyder et al. |
| 6,241,683 B1 | 6/2001 | Macklem et al. |
| 6,253,097 B1 | 6/2001 | Aronow et al. |
| 6,255,708 B1 | 7/2001 | Sudharsanan et al. |
| 6,280,381 B1 | 8/2001 | Malin et al. |
| 6,285,896 B1 | 9/2001 | Tobler et al. |
| 6,308,089 B1 | 10/2001 | von der Ruhr et al. |
| 6,317,627 B1 | 11/2001 | Ennen et al. |
| 6,321,100 B1 | 11/2001 | Parker |
| 6,334,065 B1 | 12/2001 | Al-Ali et al. |
| 6,360,114 B1 | 3/2002 | Diab et al. |
| 6,368,283 B1 | 4/2002 | Xu et al. |
| 6,411,373 B1 | 6/2002 | Garside et al. |
| 6,415,167 B1 | 7/2002 | Blank et al. |
| 6,430,437 B1 | 8/2002 | Marro |
| 6,430,525 B1 | 8/2002 | Weber et al. |
| 6,463,311 B1 | 10/2002 | Diab |
| 6,470,199 B1 | 10/2002 | Kopotic et al. |
| 6,487,429 B2 | 11/2002 | Hockersmith et al. |
| 6,505,059 B1 | 1/2003 | Kollias et al. |
| 6,525,386 B1 | 2/2003 | Mills et al. |
| 6,526,300 B1 | 2/2003 | Kiani et al. |
| 6,534,012 B1 | 3/2003 | Hazen et al. |
| 6,542,764 B1 | 4/2003 | Al-Ali et al. |
| 6,580,086 B1 | 6/2003 | Schulz et al. |
| 6,584,336 B1 | 6/2003 | Ali et al. |
| 6,587,196 B1 | 7/2003 | Stippick et al. |
| 6,587,199 B1 | 7/2003 | Luu |
| 6,597,932 B2 | 7/2003 | Tian et al. |
| 6,606,511 B1 | 8/2003 | Ali et al. |
| 6,635,559 B2 | 10/2003 | Greenwald et al. |
| 6,639,668 B1 | 10/2003 | Trepagnier |
| 6,640,116 B2 | 10/2003 | Diab |
| 6,640,117 B2 | 10/2003 | Makarewicz et al. |
| 6,658,276 B2 | 12/2003 | Kiani et al. |
| 6,661,161 B1 | 12/2003 | Lanzo et al. |
| 6,697,656 B1 | 2/2004 | Al-Ali |
| 6,697,658 B2 | 2/2004 | Al-Ali |
| RE38,476 E | 3/2004 | Diab et al. |
| RE38,492 E | 4/2004 | Diab et al. |
| 6,738,652 B2 | 5/2004 | Mattu et al. |
| 6,760,607 B2 | 7/2004 | Al-Ali |
| 6,788,965 B2 | 9/2004 | Ruchti et al. |
| 6,816,241 B2 | 11/2004 | Grubisic |
| 6,822,564 B2 | 11/2004 | Al-Ali |
| 6,850,787 B2 | 2/2005 | Weber et al. |
| 6,850,788 B2 | 2/2005 | Al-Ali |
| 6,876,931 B2 | 4/2005 | Lorenz et al. |
| 6,920,345 B2 | 7/2005 | Al-Ali et al. |
| 6,934,570 B2 | 8/2005 | Kiani et al. |
| 6,943,348 B1 | 9/2005 | Coffin, IV |
| 6,956,649 B2 | 10/2005 | Acosta et al. |
| 6,961,598 B2 | 11/2005 | Diab |
| 6,970,792 B1 | 11/2005 | Diab |
| 6,985,764 B2 | 1/2006 | Mason et al. |
| 6,990,364 B2 | 1/2006 | Ruchti et al. |
| 6,998,247 B2 | 2/2006 | Monfre et al. |
| 7,003,338 B2 | 2/2006 | Weber et al. |
| 7,015,451 B2 | 3/2006 | Dalke et al. |
| 7,027,849 B2 | 4/2006 | Al-Ali |
| D526,719 S | 8/2006 | Richie, Jr. et al. |
| 7,096,052 B2 | 8/2006 | Mason et al. |
| 7,096,054 B2 | 8/2006 | Abdul-Hafiz et al. |
| D529,616 S | 10/2006 | Deros et al. |
| 7,133,710 B2 | 11/2006 | Acosta et al. |
| 7,142,901 B2 | 11/2006 | Kiani et al. |
| 7,225,006 B2 | 5/2007 | Al-Ali et al. |
| RE39,672 E | 6/2007 | Shehada et al. |
| 7,254,429 B2 | 8/2007 | Schurman et al. |
| 7,254,431 B2 | 8/2007 | Al-Ali et al. |
| 7,254,434 B2 | 8/2007 | Schulz et al. |
| 7,274,955 B2 | 9/2007 | Kiani et al. |
| D554,263 S | 10/2007 | Al-Ali et al. |
| 7,280,858 B2 | 10/2007 | Al-Ali et al. |
| 7,289,835 B2 | 10/2007 | Mansfield et al. |
| 7,292,883 B2 | 11/2007 | De Felice et al. |
| 7,341,559 B2 | 3/2008 | Schulz et al. |
| 7,343,186 B2 | 3/2008 | Lamego et al. |
| D566,282 S | 4/2008 | Al-Ali et al. |
| 7,356,365 B2 | 4/2008 | Schurman |
| 7,371,981 B2 | 5/2008 | Abdul-Hafiz |
| 7,373,193 B2 | 5/2008 | Al-Ali et al. |
| 7,377,794 B2 | 5/2008 | Al-Ali et al. |
| 7,395,158 B2 | 7/2008 | Monfre et al. |
| 7,415,297 B2 | 8/2008 | Al-Ali et al. |
| 7,438,683 B2 | 10/2008 | Al-Ali et al. |
| 7,483,729 B2 | 1/2009 | Al-Ali et al. |
| D587,657 S | 3/2009 | Al-Ali et al. |
| 7,500,950 B2 | 3/2009 | Al-Ali et al. |
| 7,509,494 B2 | 3/2009 | Al-Ali |
| 7,510,849 B2 | 3/2009 | Schurman et al. |
| 7,514,725 B2 | 4/2009 | Wojtczuk et al. |
| 7,519,406 B2 | 4/2009 | Blank et al. |
| D592,507 S | 5/2009 | Wachman et al. |
| 7,530,942 B1 | 5/2009 | Diab |
| 7,593,230 B2 | 9/2009 | Abul-Haj et al. |
| 7,596,398 B2 | 9/2009 | Al-Ali et al. |
| 7,606,608 B2 | 10/2009 | Blank et al. |
| 7,620,674 B2 | 11/2009 | Ruchti et al. |
| D606,659 S | 12/2009 | Kiani et al. |
| 7,629,039 B2 | 12/2009 | Eckerbom et al. |
| 7,640,140 B2 | 12/2009 | Ruchti et al. |
| 7,647,083 B2 | 1/2010 | Al-Ali et al. |
| D609,193 S | 2/2010 | Al-Ali et al. |
| D614,305 S | 4/2010 | Al-Ali et al. |
| 7,697,966 B2 | 4/2010 | Monfre et al. |
| 7,698,105 B2 | 4/2010 | Ruchti et al. |
| RE41,317 E | 5/2010 | Parker |
| RE41,333 E | 5/2010 | Blank et al. |
| 7,729,733 B2 | 6/2010 | Al-Ali et al. |
| 7,761,127 B2 | 7/2010 | Al-Ali et al. |
| 7,764,982 B2 | 7/2010 | Dalke et al. |
| D621,516 S | 8/2010 | Kiani et al. |
| 7,791,155 B2 | 9/2010 | Diab |
| RE41,912 E | 11/2010 | Parker |
| 7,880,626 B2 | 2/2011 | Al-Ali et al. |
| 7,909,772 B2 | 3/2011 | Popov et al. |
| 7,919,713 B2 | 4/2011 | Al-Ali et al. |
| 7,937,128 B2 | 5/2011 | Al-Ali |
| 7,937,129 B2 | 5/2011 | Mason et al. |
| 7,941,199 B2 | 5/2011 | Kiani |
| 7,957,780 B2 | 6/2011 | Lamego et al. |
| 7,962,188 B2 | 6/2011 | Kiani et al. |
| 7,976,472 B2 | 7/2011 | Kiani |
| 7,990,382 B2 | 8/2011 | Kiani |
| 8,008,088 B2 | 8/2011 | Bellott et al. |
| RE42,753 E | 9/2011 | Kiani-Azarbayjany et al. |
| 8,028,701 B2 | 10/2011 | Al-Ali et al. |
| 8,048,040 B2 | 11/2011 | Kiani |
| 8,050,728 B2 | 11/2011 | Al-Ali et al. |
| RE43,169 E | 2/2012 | Parker |
| 8,118,620 B2 | 2/2012 | Al-Ali et al. |

(56) References Cited

U.S. PATENT DOCUMENTS

| | | |
|---|---|---|
| 8,130,105 B2 | 3/2012 | Al-Ali et al. |
| 8,182,443 B1 | 5/2012 | Kiani |
| 8,190,223 B2 | 5/2012 | Al-Ali et al. |
| 8,203,438 B2 | 6/2012 | Kiani et al. |
| 8,203,704 B2 | 6/2012 | Merritt et al. |
| 8,219,172 B2 | 7/2012 | Schurman et al. |
| 8,224,411 B2 | 7/2012 | Al-Ali et al. |
| 8,229,532 B2 | 7/2012 | Davis |
| 8,233,955 B2 | 7/2012 | Al-Ali et al. |
| 8,255,026 B1 | 8/2012 | Al-Ali |
| 8,265,723 B1 | 9/2012 | McHale et al. |
| 8,274,360 B2 | 9/2012 | Sampath et al. |
| 8,280,473 B2 | 10/2012 | Al-Ali |
| 8,315,683 B2 | 11/2012 | Al-Ali et al. |
| RE43,860 E | 12/2012 | Parker |
| 8,346,330 B2 | 1/2013 | Lamego |
| 8,353,842 B2 | 1/2013 | Al-Ali et al. |
| 8,355,766 B2 | 1/2013 | MacNeish, III et al. |
| 8,374,665 B2 | 2/2013 | Lamego |
| 8,388,353 B2 | 3/2013 | Kiani et al. |
| 8,401,602 B2 | 3/2013 | Kiani |
| 8,414,499 B2 | 4/2013 | Al-Ali et al. |
| 8,418,524 B2 | 4/2013 | Al-Ali |
| 8,428,967 B2 | 4/2013 | Olsen et al. |
| 8,430,817 B1 | 4/2013 | Al-Ali et al. |
| 8,437,825 B2 | 5/2013 | Dalvi et al. |
| 8,455,290 B2 | 6/2013 | Siskavich |
| 8,457,707 B2 | 6/2013 | Kiani |
| 8,471,713 B2 | 6/2013 | Poeze et al. |
| 8,473,020 B2 | 6/2013 | Kiani et al. |
| 8,509,867 B2 | 8/2013 | Workman et al. |
| 8,515,509 B2 | 8/2013 | Bruinsma et al. |
| 8,523,781 B2 | 9/2013 | Al-Ali |
| D692,145 S | 10/2013 | Al-Ali et al. |
| 8,571,617 B2 | 10/2013 | Reichgott et al. |
| 8,571,618 B1 | 10/2013 | Lamego et al. |
| 8,571,619 B2 | 10/2013 | Al-Ali et al. |
| 8,577,431 B2 | 11/2013 | Lamego et al. |
| 8,584,345 B2 | 11/2013 | Al-Ali et al. |
| 8,588,880 B2 | 11/2013 | Abdul-Hafiz et al. |
| 8,630,691 B2 | 1/2014 | Lamego et al. |
| 8,641,631 B2 | 2/2014 | Sierra et al. |
| 8,652,060 B2 | 2/2014 | Al-Ali |
| 8,666,468 B1 | 3/2014 | Ai-Ai |
| 8,670,811 B2 | 3/2014 | O'Reilly |
| RE44,823 E | 4/2014 | Parker |
| RE44,875 E | 4/2014 | Kiani et al. |
| 8,688,183 B2 | 4/2014 | Bruinsma et al. |
| 8,690,799 B2 | 4/2014 | Telfort et al. |
| 8,702,627 B2 | 4/2014 | Telfort et al. |
| 8,712,494 B1 | 4/2014 | MacNeish, III et al. |
| 8,715,206 B2 | 5/2014 | Telfort et al. |
| 8,723,677 B1 | 5/2014 | Kiani |
| 8,740,792 B1 | 6/2014 | Kiani et al. |
| 8,755,535 B2 | 6/2014 | Telfort et al. |
| 8,755,872 B1 | 6/2014 | Marinow |
| 8,764,671 B2 | 7/2014 | Kiani |
| 8,768,423 B2 | 7/2014 | Shakespeare et al. |
| 8,771,204 B2 | 7/2014 | Telfort et al. |
| 8,781,544 B2 | 7/2014 | Al-Ali et al. |
| 8,790,268 B2 | 7/2014 | Al-Ali |
| 8,801,613 B2 | 8/2014 | Al-Ali et al. |
| 8,821,397 B2 | 9/2014 | Al-Ali et al. |
| 8,821,415 B2 | 9/2014 | Al-Ali et al. |
| 8,830,449 B1 | 9/2014 | Lamego et al. |
| 8,840,549 B2 | 9/2014 | Al-Ali et al. |
| 8,852,094 B2 | 10/2014 | Al-Ali et al. |
| 8,852,994 B2 | 10/2014 | Wojtczuk et al. |
| 8,897,847 B2 | 11/2014 | Al-Ali |
| 8,911,377 B2 | 12/2014 | Al-Ali |
| 8,989,831 B2 | 3/2015 | Al-Ali et al. |
| 8,998,809 B2 | 4/2015 | Kiani |
| 9,066,666 B2 | 6/2015 | Kiani |
| 9,066,680 B1 | 6/2015 | Al-Ali et al. |
| 9,095,316 B2 | 8/2015 | Welch et al. |
| 9,106,038 B2 | 8/2015 | Telfort et al. |
| 9,107,625 B2 | 8/2015 | Telfort et al. |
| 9,131,881 B2 | 9/2015 | Diab et al. |
| 9,138,180 B1 | 9/2015 | Coverston et al. |
| 9,153,112 B1 | 10/2015 | Kiani et al. |
| 9,192,329 B2 | 11/2015 | Al-Ali |
| 9,192,351 B1 | 11/2015 | Telfort et al. |
| 9,195,385 B2 | 11/2015 | Al-Ali et al. |
| 9,211,095 B1 | 12/2015 | Al-Ali |
| 9,218,454 B2 | 12/2015 | Kiani et al. |
| 9,245,668 B1 | 1/2016 | Vo et al. |
| 9,267,572 B2 | 2/2016 | Barker et al. |
| 9,277,880 B2 | 3/2016 | Poeze et al. |
| 9,307,928 B1 | 4/2016 | Al-Ali et al. |
| 9,323,894 B2 | 4/2016 | Kiani |
| D755,392 S | 5/2016 | Hwang et al. |
| 9,326,712 B1 | 5/2016 | Kiani |
| 9,392,945 B2 | 7/2016 | Al-Ali et al. |
| 9,408,542 B1 | 8/2016 | Kinast et al. |
| 9,436,645 B2 | 9/2016 | Al-Ali et al. |
| 9,445,759 B1 | 9/2016 | Lamego et al. |
| 9,474,474 B2 | 10/2016 | Lamego et al. |
| 9,480,435 B2 | 11/2016 | Olsen |
| 9,497,530 B1 | 11/2016 | Campbell et al. |
| 9,510,779 B2 | 12/2016 | Poeze et al. |
| 9,517,024 B2 | 12/2016 | Kiani et al. |
| 9,532,722 B2 | 1/2017 | Lamego et al. |
| 9,560,996 B2 | 2/2017 | Kiani |
| 9,579,039 B2 | 2/2017 | Jansen et al. |
| 9,622,692 B2 | 4/2017 | Lamego et al. |
| D788,312 S | 5/2017 | Al-Ali et al. |
| 9,649,054 B2 | 5/2017 | Lamego et al. |
| 9,697,928 B2 | 7/2017 | Al-Ali et al. |
| 9,717,458 B2 | 8/2017 | Lamego et al. |
| 9,724,016 B1 | 8/2017 | Al-Ali et al. |
| 9,724,024 B2 | 8/2017 | Al-Ali |
| 9,724,025 B1 | 8/2017 | Kiani et al. |
| 9,749,232 B2 | 8/2017 | Sampath et al. |
| 9,750,442 B2 | 9/2017 | Olsen |
| 9,750,461 B1 | 9/2017 | Telfort |
| 9,775,545 B2 | 10/2017 | Al-Ali et al. |
| 9,778,079 B1 | 10/2017 | Al-Ali et al. |
| 9,782,077 B2 | 10/2017 | Lamego et al. |
| 9,787,568 B2 | 10/2017 | Lamego et al. |
| 9,808,188 B1 | 11/2017 | Perea et al. |
| 9,839,379 B2 | 12/2017 | Al-Ali et al. |
| 9,839,381 B1 | 12/2017 | Weber et al. |
| 9,847,749 B2 | 12/2017 | Kiani et al. |
| 9,848,800 B1 | 12/2017 | Lee et al. |
| 9,861,298 B2 | 1/2018 | Eckerbom et al. |
| 9,861,305 B1 | 1/2018 | Weber et al. |
| 9,877,650 B2 | 1/2018 | Muhsin et al. |
| 9,891,079 B2 | 2/2018 | Dalvi |
| 9,924,897 B1 | 3/2018 | Abdul-Hafiz |
| 9,936,917 B2 | 4/2018 | Poeze et al. |
| 9,955,937 B2 | 5/2018 | Telfort |
| 9,965,946 B2 | 5/2018 | Al-Ali et al. |
| D820,865 S | 6/2018 | Muhsin et al. |
| 9,986,952 B2 | 6/2018 | Dalvi et al. |
| D822,215 S | 7/2018 | Al-Ali et al. |
| D822,216 S | 7/2018 | Barker et al. |
| 10,010,276 B2 | 7/2018 | Al-Ali et al. |
| 10,086,138 B1 | 10/2018 | Novak, Jr. |
| 10,111,591 B2 | 10/2018 | Dyell et al. |
| D833,624 S | 11/2018 | DeJong et al. |
| 10,123,729 B2 | 11/2018 | Dyell et al. |
| D835,282 S | 12/2018 | Barker et al. |
| D835,283 S | 12/2018 | Barker et al. |
| D835,284 S | 12/2018 | Barker et al. |
| D835,285 S | 12/2018 | Barker et al. |
| 10,149,616 B2 | 12/2018 | Al-Ali et al. |
| 10,154,815 B2 | 12/2018 | Al-Ali et al. |
| 10,159,412 B2 | 12/2018 | Lamego et al. |
| 10,165,345 B2 | 12/2018 | Slater et al. |
| 10,188,348 B2 | 1/2019 | Al-Ali et al. |
| RE47,218 E | 2/2019 | Al-Ali |
| RE47,244 E | 2/2019 | Kiani et al. |
| RE47,249 E | 2/2019 | Kiani et al. |
| 10,205,291 B2 | 2/2019 | Scruggs et al. |

(56) References Cited

U.S. PATENT DOCUMENTS

| | | |
|---|---|---|
| 10,226,187 B2 | 3/2019 | Al-Ali et al. |
| 10,231,657 B2 | 3/2019 | Al-Ali et al. |
| 10,231,670 B2 | 3/2019 | Blank et al. |
| RE47,353 E | 4/2019 | Kiani et al. |
| 10,279,247 B2 | 5/2019 | Kiani |
| 10,292,664 B2 | 5/2019 | Al-Ali |
| 10,299,720 B2 | 5/2019 | Brown et al. |
| 10,327,337 B2 | 6/2019 | Schmidt et al. |
| 10,327,713 B2 | 6/2019 | Barker et al. |
| 10,332,630 B2 | 6/2019 | Ai-Ali |
| 10,383,520 B2 | 8/2019 | Wojtczuk et al. |
| 10,383,527 B2 | 8/2019 | Ai-Ali |
| 10,388,120 B2 | 8/2019 | Muhsin et al. |
| D864,120 S | 10/2019 | Forrest et al. |
| 10,441,181 B1 | 10/2019 | Telfort et al. |
| 10,441,196 B2 | 10/2019 | Eckerbom et al. |
| 10,448,844 B2 | 10/2019 | Al-Ali et al. |
| 10,448,871 B2 | 10/2019 | Al-Ali et al. |
| 10,456,038 B2 | 10/2019 | Lamego et al. |
| 10,463,340 B2 | 11/2019 | Telfort et al. |
| 10,471,159 B1 | 11/2019 | Lapotko et al. |
| 10,505,311 B2 | 12/2019 | Al-Ali et al. |
| 10,524,738 B2 | 1/2020 | Olsen |
| 10,532,174 B2 | 1/2020 | Al-Ali |
| 10,536,763 B2 | 1/2020 | Slater et al. |
| 10,537,285 B2 | 1/2020 | Shreim et al. |
| 10,542,903 B2 | 1/2020 | Al-Ali et al. |
| 10,555,678 B2 | 2/2020 | Dalvi et al. |
| 10,568,553 B2 | 2/2020 | O'Neil et al. |
| 10,608,817 B2 | 3/2020 | Haider et al. |
| D880,477 S | 4/2020 | Forrest et al. |
| 10,617,302 B2 | 4/2020 | Al-Ali et al. |
| 10,617,335 B2 | 4/2020 | Al-Ali et al. |
| 10,637,181 B2 | 4/2020 | Al-Ali et al. |
| D886,849 S | 6/2020 | Muhsin et al. |
| D887,548 S | 6/2020 | Abdul-Hafiz et al. |
| D887,549 S | 6/2020 | Abdul-Hafiz et al. |
| 10,667,764 B2 | 6/2020 | Ahmed et al. |
| D890,708 S | 7/2020 | Forrest et al. |
| 10,721,785 B2 | 7/2020 | Al-Ali |
| 10,736,518 B2 | 8/2020 | Al-Ali et al. |
| 10,750,984 B2 | 8/2020 | Pauley et al. |
| D897,098 S | 9/2020 | Al-Ali |
| 10,779,098 B2 | 9/2020 | Iswanto et al. |
| 10,827,961 B1 | 11/2020 | Iyengar et al. |
| 10,828,007 B1 | 11/2020 | Telfort et al. |
| 10,832,818 B2 | 11/2020 | Muhsin et al. |
| 10,849,554 B2 | 12/2020 | Shreim et al. |
| 10,856,750 B2 | 12/2020 | Indorf |
| D906,970 S | 1/2021 | Forrest et al. |
| D908,213 S | 1/2021 | Abdul-Hafiz et al. |
| 10,918,281 B2 | 2/2021 | Al-Ali et al. |
| 10,932,705 B2 | 3/2021 | Muhsin et al. |
| 10,932,729 B2 | 3/2021 | Kiani et al. |
| 10,939,878 B2 | 3/2021 | Kiani et al. |
| 10,956,950 B2 | 3/2021 | Al-Ali et al. |
| D916,135 S | 4/2021 | Indorf et al. |
| D917,046 S | 4/2021 | Abdul-Hafiz et al. |
| D917,550 S | 4/2021 | Indorf et al. |
| D917,564 S | 4/2021 | Indorf et al. |
| D917,704 S | 4/2021 | Al-Ali et al. |
| 10,987,066 B2 | 4/2021 | Chandran et al. |
| 10,991,135 B2 | 4/2021 | Al-Ali et al. |
| D919,094 S | 5/2021 | Al-Ali et al. |
| D919,100 S | 5/2021 | Al-Ali et al. |
| 11,006,867 B2 | 5/2021 | Al-Ali |
| D921,202 S | 6/2021 | Al-Ali et al. |
| 11,024,064 B2 | 6/2021 | Muhsin et al. |
| 11,026,604 B2 | 6/2021 | Chen et al. |
| D925,597 S | 7/2021 | Chandran et al. |
| D927,699 S | 8/2021 | Al-Ali et al. |
| 11,076,777 B2 | 8/2021 | Lee et al. |
| 11,114,188 B2 | 9/2021 | Poeze et al. |
| D933,232 S | 10/2021 | Al-Ali et al. |
| D933,233 S | 10/2021 | Al-Ali et al. |
| D933,234 S | 10/2021 | Al-Ali et al. |
| 11,145,408 B2 | 10/2021 | Sampath et al. |
| 11,147,518 B1 | 10/2021 | Al-Ali et al. |
| 11,185,262 B2 | 11/2021 | Al-Ali et al. |
| 11,191,484 B2 | 12/2021 | Kiani et al. |
| D946,596 S | 3/2022 | Ahmed |
| D946,597 S | 3/2022 | Ahmed |
| D946,598 S | 3/2022 | Ahmed |
| D946,617 S | 3/2022 | Ahmed |
| 11,272,839 B2 | 3/2022 | Al-Ali et al. |
| 11,289,199 B2 | 3/2022 | Al-Ali |
| RE49,034 E | 4/2022 | Ai-Ali |
| 11,298,021 B2 | 4/2022 | Muhsin et al. |
| D950,580 S | 5/2022 | Ahmed |
| D950,599 S | 5/2022 | Ahmed |
| D950,738 S | 5/2022 | Al-Ali et al. |
| D957,648 S | 7/2022 | Al-Ali |
| 11,382,567 B2 | 7/2022 | O'Brien et al. |
| 11,389,093 B2 | 7/2022 | Triman et al. |
| 11,406,286 B2 | 8/2022 | Al-Ali et al. |
| 11,417,426 B2 | 8/2022 | Muhsin et al. |
| 11,439,329 B2 | 9/2022 | Lamego |
| 11,445,948 B2 | 9/2022 | Scruggs et al. |
| D965,789 S | 10/2022 | Al-Ali et al. |
| D967,433 S | 10/2022 | Al-Ali et al. |
| 11,464,410 B2 | 10/2022 | Muhsin |
| 11,504,058 B1 | 11/2022 | Sharma et al. |
| 11,504,066 B1 | 11/2022 | Dalvi et al. |
| D971,933 S | 12/2022 | Ahmed |
| D973,072 S | 12/2022 | Ahmed |
| D973,685 S | 12/2022 | Ahmed |
| D973,686 S | 12/2022 | Ahmed |
| D974,193 S | 1/2023 | Forrest et al. |
| D979,516 S | 2/2023 | Al-Ali et al. |
| D980,091 S | 3/2023 | Forrest et al. |
| 11,596,363 B2 | 3/2023 | Lamego |
| 11,627,919 B2 | 4/2023 | Kiani et al. |
| 11,637,437 B2 | 4/2023 | Al-Ali et al. |
| D985,498 S | 5/2023 | Al-Ali et al. |
| 11,653,862 B2 | 5/2023 | Dalvi et al. |
| D989,112 S | 6/2023 | Muhsin et al. |
| D989,327 S | 6/2023 | Al-Ali et al. |
| 11,678,829 B2 | 6/2023 | Al-Ali et al. |
| 11,679,579 B2 | 6/2023 | Al-Ali |
| 11,684,296 B2 | 6/2023 | Vo et al. |
| 11,692,934 B2 | 7/2023 | Normand et al. |
| 11,701,043 B2 | 7/2023 | Al-Ali et al. |
| D997,365 S | 8/2023 | Hwang |
| 11,721,105 B2 | 8/2023 | Ranasinghe et al. |
| 11,730,379 B2 | 8/2023 | Ahmed et al. |
| D998,625 S | 9/2023 | Indorf et al. |
| D998,630 S | 9/2023 | Indorf et al. |
| D998,631 S | 9/2023 | Indorf et al. |
| D999,244 S | 9/2023 | Indorf et al. |
| D999,245 S | 9/2023 | Indorf et al. |
| D999,246 S | 9/2023 | Indorf et al. |
| 11,766,198 B2 | 9/2023 | Pauley et al. |
| D1,000,975 S | 10/2023 | Al-Ali et al. |
| 11,803,623 B2 | 10/2023 | Kiani et al. |
| 11,832,940 B2 | 12/2023 | Diab et al. |
| 11,872,156 B2 | 1/2024 | Telfort et al. |
| 11,879,960 B2 | 1/2024 | Ranasinghe et al. |
| 2001/0034477 A1 | 10/2001 | Mansfield et al. |
| 2001/0039483 A1 | 11/2001 | Brand et al. |
| 2002/0010401 A1 | 1/2002 | Bushmakin et al. |
| 2002/0058864 A1 | 5/2002 | Mansfield et al. |
| 2002/0133080 A1 | 9/2002 | Apruzzese et al. |
| 2003/0013975 A1 | 1/2003 | Kiani |
| 2003/0018243 A1 | 1/2003 | Gerhardt et al. |
| 2003/0144582 A1 | 7/2003 | Cohen et al. |
| 2003/0156288 A1 | 8/2003 | Barnum et al. |
| 2003/0212312 A1 | 11/2003 | Coffin, IV et al. |
| 2004/0106163 A1 | 6/2004 | Workman, Jr. et al. |
| 2005/0055276 A1 | 3/2005 | Kiani et al. |
| 2005/0234317 A1 | 10/2005 | Kiani |
| 2006/0073719 A1 | 4/2006 | Kiani |
| 2006/0189871 A1 | 8/2006 | Al-Ali et al. |
| 2007/0073116 A1 | 3/2007 | Kiani et al. |
| 2007/0180140 A1 | 8/2007 | Welch et al. |

(56) References Cited

U.S. PATENT DOCUMENTS

| | | |
|---|---|---|
| 2007/0244377 A1 | 10/2007 | Cozad et al. |
| 2008/0064965 A1 | 3/2008 | Jay et al. |
| 2008/0094228 A1 | 4/2008 | Welch et al. |
| 2008/0103375 A1 | 5/2008 | Kiani |
| 2008/0221418 A1 | 9/2008 | Al-Ali et al. |
| 2009/0036759 A1 | 2/2009 | Ault et al. |
| 2009/0093687 A1 | 4/2009 | Telfort et al. |
| 2009/0095926 A1 | 4/2009 | MacNeish, III |
| 2009/0247984 A1 | 10/2009 | Lamego et al. |
| 2009/0275844 A1 | 11/2009 | Al-Ali |
| 2010/0004518 A1 | 1/2010 | Vo et al. |
| 2010/0030040 A1 | 2/2010 | Poeze et al. |
| 2010/0099964 A1 | 4/2010 | O'Reilly et al. |
| 2010/0234718 A1 | 9/2010 | Sampath et al. |
| 2010/0270257 A1 | 10/2010 | Wachman et al. |
| 2011/0028806 A1 | 2/2011 | Merritt et al. |
| 2011/0028809 A1 | 2/2011 | Goodman |
| 2011/0040197 A1 | 2/2011 | Welch et al. |
| 2011/0082711 A1 | 4/2011 | Poeze et al. |
| 2011/0087081 A1 | 4/2011 | Kiani et al. |
| 2011/0118561 A1 | 5/2011 | Tari et al. |
| 2011/0137297 A1 | 6/2011 | Kiani et al. |
| 2011/0172498 A1 | 7/2011 | Olsen et al. |
| 2011/0274284 A1 * | 11/2011 | Mulder ............ G10K 11/17873 381/72 |
| 2012/0123231 A1 | 5/2012 | O'Reilly |
| 2012/0165629 A1 | 6/2012 | Merritt et al. |
| 2012/0209084 A1 | 8/2012 | Olsen et al. |
| 2012/0226117 A1 | 9/2012 | Lamego et al. |
| 2012/0283524 A1 | 11/2012 | Kiani et al. |
| 2013/0023775 A1 | 1/2013 | Lamego et al. |
| 2013/0060147 A1 | 3/2013 | Welch et al. |
| 2013/0096405 A1 | 4/2013 | Garfio |
| 2013/0296672 A1 | 11/2013 | O'Neil et al. |
| 2013/0345921 A1 | 12/2013 | Al-Ali et al. |
| 2014/0166076 A1 | 6/2014 | Kiani et al. |
| 2014/0180160 A1 | 6/2014 | Brown et al. |
| 2014/0187973 A1 | 7/2014 | Brown et al. |
| 2014/0275871 A1 | 9/2014 | Lamego et al. |
| 2014/0275872 A1 | 9/2014 | Merritt et al. |
| 2014/0316217 A1 | 10/2014 | Purdon et al. |
| 2014/0316218 A1 | 10/2014 | Purdon et al. |
| 2014/0323897 A1 | 10/2014 | Brown et al. |
| 2014/0323898 A1 | 10/2014 | Purdon et al. |
| 2015/0005600 A1 | 1/2015 | Blank et al. |
| 2015/0011907 A1 | 1/2015 | Purdon et al. |
| 2015/0073241 A1 | 3/2015 | Lamego |
| 2015/0080754 A1 | 3/2015 | Purdon et al. |
| 2015/0099950 A1 | 4/2015 | Al-Ali et al. |
| 2017/0024748 A1 | 1/2017 | Haider |
| 2017/0251974 A1 | 9/2017 | Shreim et al. |
| 2018/0242926 A1 | 8/2018 | Muhsin et al. |
| 2018/0247712 A1 | 8/2018 | Muhsin et al. |
| 2019/0320906 A1 | 10/2019 | Olsen |
| 2020/0111552 A1 | 4/2020 | Ahmed |
| 2020/0113520 A1 | 4/2020 | Abdul-Hafiz et al. |
| 2020/0138368 A1 | 5/2020 | Kiani et al. |
| 2020/0163597 A1 | 5/2020 | Dalvi et al. |
| 2020/0253474 A1 | 8/2020 | Muhsin et al. |
| 2020/0253544 A1 | 8/2020 | Belur Nagaraj et al. |
| 2020/0275841 A1 | 9/2020 | Telfort et al. |
| 2020/0288983 A1 | 9/2020 | Telfort et al. |
| 2020/0329983 A1 | 10/2020 | Al-Ali et al. |
| 2020/0329993 A1 | 10/2020 | Al-Ali et al. |
| 2021/0022628 A1 | 1/2021 | Telfort et al. |
| 2021/0104173 A1 | 4/2021 | Pauley et al. |
| 2021/0117525 A1 | 4/2021 | Kiani et al. |
| 2021/0121582 A1 | 4/2021 | Krishnamani et al. |
| 2021/0161465 A1 | 6/2021 | Barker et al. |
| 2021/0236729 A1 | 8/2021 | Kiani et al. |
| 2021/0275101 A1 | 9/2021 | Vo et al. |
| 2021/0290072 A1 | 9/2021 | Forrest |
| 2021/0290080 A1 | 9/2021 | Ahmed |
| 2021/0290120 A1 | 9/2021 | Al-Ali |
| 2021/0290177 A1 | 9/2021 | Novak, Jr. |
| 2021/0290184 A1 | 9/2021 | Ahmed |
| 2021/0296008 A1 | 9/2021 | Novak, Jr. |
| 2021/0330228 A1 | 10/2021 | Olsen et al. |
| 2021/0383011 A1 | 12/2021 | Campbell et al. |
| 2021/0386382 A1 | 12/2021 | Olsen et al. |
| 2021/0402110 A1 | 12/2021 | Pauley et al. |
| 2022/0039707 A1 | 2/2022 | Sharma et al. |
| 2022/0053892 A1 | 2/2022 | Al-Ali et al. |
| 2022/0070604 A1 | 3/2022 | Campbell et al. |
| 2022/0071562 A1 | 3/2022 | Kiani |
| 2022/0096603 A1 | 3/2022 | Kiani et al. |
| 2022/0151521 A1 | 5/2022 | Krishnamani et al. |
| 2022/0218244 A1 | 7/2022 | Kiani et al. |
| 2022/0287574 A1 | 9/2022 | Telfort et al. |
| 2022/0296161 A1 | 9/2022 | Al-Ali et al. |
| 2022/0361819 A1 | 11/2022 | Al-Ali et al. |
| 2022/0379059 A1 | 12/2022 | Yu et al. |
| 2022/0392610 A1 | 12/2022 | Kiani et al. |
| 2023/0028745 A1 | 1/2023 | Al-Ali |
| 2023/0038389 A1 | 2/2023 | Vo |
| 2023/0045647 A1 | 2/2023 | Vo |
| 2023/0058052 A1 | 2/2023 | Al-Ali |
| 2023/0058342 A1 | 2/2023 | Kiani |
| 2023/0069789 A1 | 3/2023 | Koo et al. |
| 2023/0087671 A1 | 3/2023 | Telfort et al. |
| 2023/0110152 A1 | 4/2023 | Forrest et al. |
| 2023/0111198 A1 | 4/2023 | Yu et al. |
| 2023/0115397 A1 | 4/2023 | Vo et al. |
| 2023/0116371 A1 | 4/2023 | Mills et al. |
| 2023/0135297 A1 | 5/2023 | Kiani et al. |
| 2023/0138098 A1 | 5/2023 | Telfort et al. |
| 2023/0145155 A1 | 5/2023 | Krishnamani et al. |
| 2023/0147750 A1 | 5/2023 | Barker et al. |
| 2023/0210417 A1 | 7/2023 | Al-Ali et al. |
| 2023/0222805 A1 | 7/2023 | Muhsin et al. |
| 2023/0222887 A1 | 7/2023 | Muhsin et al. |
| 2023/0226331 A1 | 7/2023 | Kiani et al. |
| 2023/0284916 A1 | 9/2023 | Telfort |
| 2023/0284943 A1 | 9/2023 | Scruggs et al. |
| 2023/0301562 A1 | 9/2023 | Scruggs et al. |
| 2023/0346993 A1 | 11/2023 | Kiani et al. |
| 2023/0368221 A1 | 11/2023 | Haider |
| 2023/0371893 A1 | 11/2023 | Al-Ali et al. |
| 2023/0389837 A1 | 12/2023 | Krishnamani et al. |
| 2024/0016418 A1 | 1/2024 | Devadoss et al. |
| 2024/0016419 A1 | 1/2024 | Devadoss et al. |

* cited by examiner

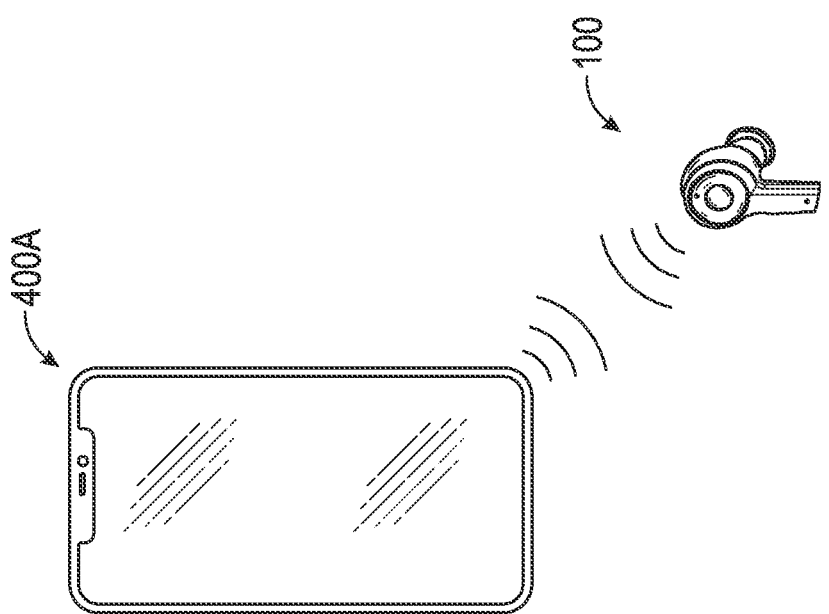

SYSTEMS AND METHODS FOR GENERATING AN EQUAL-LOUDNESS CONTOUR RESPONSE USING AN AURICULAR DEVICE

CROSS-REFERENCE TO RELATED APPLICATIONS

This application claims benefit of U.S. Provisional Patent Application No. 63/483,444, filed Feb. 6, 2023, and titled "SYSTEMS AND METHODS FOR GENERATING AN EQUAL-LOUDNESS CONTOUR RESPONSE USING AN AURICULAR DEVICE." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to devices, methods, and/or systems for generating an equal-loudness contour response using an auricular device.

BACKGROUND

Hospitals, nursing homes, and other patient care facilities typically utilize a number of sensors, devices, and/or monitors to collect or analyze a user's (which may also be referred to as a "subject", "wearer," "individual" or "patient") physiological parameters such as blood oxygen saturation level, temperature, respiratory rate, pulse rate, blood pressure, and/or the like. Such devices can include, for example, acoustic sensors, electroencephalogram (EEG) sensors, electrocardiogram (ECG) devices, blood pressure monitors, temperature sensors, and pulse oximeters, among others. In medical environments, various sensors/devices (such as those just mentioned) can be attached to a patient and connected to one or more patient monitoring devices using cables or via wireless connection. Patient monitoring devices generally include sensors, processing equipment, and displays for obtaining and analyzing a medical patient's physiological parameters. Clinicians, including doctors, nurses, and other medical personnel, use physiological parameters obtained from patient monitors to determine a patient's physiological status, diagnose illnesses, and to prescribe treatments. Clinicians also use physiological parameters to monitor patients during various clinical situations to determine whether to increase a level of medical care given to patients.

SUMMARY

Audiogram tests are widely used to evaluate hearing sensitivity and identify potential hearing impairments. In some cases, an audiogram can be used to generate a hearing profile for a user of an auricular device. However, utilizing an audiogram to generate a hearing profile comes with certain pitfalls that limit their usefulness and/or may not provide a user with a complete or satisfying listening experience. One example limitation is the focus on pure-tone thresholds at specific frequencies, typically ranging from, for example, 250 Hz to 8,000 Hz. While the typical frequency range is effective for detecting hearing loss related to peripheral auditory structures, it may overlook variations in hearing ability at frequencies outside the tested range. As a result, certain hearing disorders or abnormalities in less commonly assessed frequency bands may not be compensated for in a hearing profile utilizing an audiogram. Overall, recognizing the limitations of audiogram tests and complementing them with additional hearing profiles is crucial for obtaining a precise and enjoyable listening experience.

An auricular device can be configured to offer a user a more personalized hearing experience by modifying a received acoustic signal based on an equal-loudness hearing profile. The equal-loudness hearing profile can differ from, for example, an audiogram response in that the audiogram test generates a curve (e.g., transfer function) representing a threshold of viability, (whether the user can hear), whereas the equal-loudness hearing profile can create one or more transfer functions based on the loudness perceived by an average person and the loudness perceived by the user for a given sound (e.g., interchangeably referred to as an acoustic signal and/or the like). Additionally, an audiogram does not compensate for the user's personalized hearing deficiencies across a range of frequencies and sound-pressure levels. For this reason, an audiogram curve can be less than ideal in at least some respects.

To resolve one or more issues mentioned above, a system can include: an external device configured to transmit an acoustic signal to an auricular device; and an auricular device configured to be positioned within an ear canal of a user, the auricular device including: a speaker configured to emit sound in a range of audible frequencies; a microphone configured to receive a plurality of acoustic signals; a storage device, configured to store computer-executable instructions; and one or more processors in communication with the storage device, wherein the computer-executable instructions, when executed by the one or more processors, cause the one or more processors to: obtain an equal-loudness hearing profile of the user; receive a request to apply the equal-loudness hearing profile to an acoustic signal; receive an input including an acoustic signal; modify the acoustic signal according to the equal-loudness hearing profile; and emit a modified acoustic signal to a user via the speaker.

In some aspects, the techniques described herein relate to a system including: a storage device, configured to store computer-executable instructions; and an ear-bud configured to be positioned within an ear canal of a user, the ear-bud including: a speaker configured to emit audio in a range of audible frequencies; a microphone configured to generate audio data responsive to detecting audio; and one or more processors in communication with the storage device, wherein the computer-executable instructions, when executed by the one or more processors, cause the one or more processors to: obtain a user hearing profile, the user hearing profile including a plurality of transfer functions, the plurality of transfer functions corresponding to a user's perception of loudness for a range of audible frequencies and a range of sound-pressure levels; obtain an equal-loudness hearing profile including a plurality of contours corresponding to an average person's perception of loudness for the range of audible frequencies and the range of sound-pressure levels; receive audio data from the microphone; determine a first frequency and a first sound-pressure level for the audio data, wherein the first frequency and the first sound-pressure level are associated with at least one contour of the equal-loudness hearing profile; estimate a phon for the first frequency and the first sound-pressure level based on the at least one contour; in response to estimating the phon, determine at least one transfer function associated with the user hearing profile; compute a second sound-pressure level based on the at least one transfer function and the first frequency; generate a second audio data based on the first sound-pressure level, the second sound-pressure level, and the first frequency; and cause the speaker to emit the second audio data within the ear canal of the user, such that the user perceives the audio data as if the user has normal hearing.

In some aspects, the techniques described herein relate to a system, wherein the equal-loudness hearing profile is obtained from an external device.

In some aspects, the techniques described herein relate to a system, wherein the range of audible frequencies is 0 to 20,000 Hz.

In some aspects, the techniques described herein relate to a system, wherein the range of sound-pressure levels is 0 to 120 decibels.

In some aspects, the techniques described herein relate to a system, wherein the user hearing profile is obtained based on an otoacoustic emission, and auditory evoked potential, or an acoustic reflex.

In some aspects, the techniques described herein relate to a system, wherein at least one transfer function of the user hearing profile is associated with a user's threshold of audibility.

In some aspects, the techniques described herein relate to a system, wherein the audio data is received from an external device.

In some aspects, the techniques described herein relate to a system, wherein the user hearing profile is obtained from the storage device.

In some aspects, the techniques described herein relate to an ear-bud configured to be positioned within an ear canal of a user, the ear-bud including: a speaker configured to emit audio in a range of audible frequencies; a microphone configured to generate audio data responsive to detecting audio; a storage device, configured to store computer-executable instructions; and one or more processors in communication with the storage device, wherein the computer-executable instructions, when executed by the one or more processors, cause the one or more processors to: obtain a user hearing profile, the user hearing profile including a plurality of transfer functions, the plurality of transfer functions corresponding to a user's perception of loudness for the range of audible frequencies and a range of sound-pressure levels; obtain an equal-loudness hearing profile including a plurality of contours corresponding to an average person's perception of loudness for the range of audible frequencies and the range of sound-pressure levels; receive audio data from the microphone; determine a first frequency and a first sound-pressure level for the audio data, wherein the first frequency and the first sound-pressure level are associated with at least one contour of the equal-loudness hearing profile; estimate a phon for the first frequency and the first sound-pressure level based on the at least one contour; in response to estimating the phon, determine at least one transfer function associated with the user hearing profile; compute a second sound-pressure level based on the at least one transfer function and the first frequency; generate a second audio data based on the first sound-pressure level, the second sound-pressure level, and the first frequency; and cause the speaker to emit the second audio data within the ear canal of the user, such that the user perceives the audio data as if the user has normal hearing.

In some aspects, the techniques described herein relate to an ear-bud, wherein the equal-loudness hearing profile is obtained from an external device.

In some aspects, the techniques described herein relate to an ear-bud, wherein the range of audible frequencies is 0 to 20,000 Hz.

In some aspects, the techniques described herein relate to an ear-bud, wherein the range of sound-pressure levels is 0 to 120 decibels.

In some aspects, the techniques described herein relate to an ear-bud, wherein the user hearing profile is obtained based on an otoacoustic emission, and auditory evoked potential, or an acoustic reflex.

In some aspects, the techniques described herein relate to an ear-bud, wherein at least one transfer function of the user hearing profile is associated with a user's threshold of audibility.

In some aspects, the techniques described herein relate to an ear-bud, wherein the audio data is received from an external device.

In some aspects, the techniques described herein relate to an ear-bud, wherein the user hearing profile is obtained from the storage device.

In some aspects, the techniques described herein relate to a method including: obtaining a user hearing profile, the user hearing profile including a plurality of transfer functions, the plurality of transfer functions corresponding to a user's perception of loudness for a range of audible frequencies and a range of sound-pressure levels; obtaining an equal-loudness hearing profile including a plurality of contours corresponding to an average person's perception of loudness for the range of audible frequencies and the range of sound-pressure levels; receiving audio data from a microphone; determining a first frequency and a first sound-pressure level for the audio data, wherein the first frequency and the first sound-pressure level are associated with at least one contour of the equal-loudness hearing profile; estimating a phon for the first frequency and the first sound-pressure level based on the at least one contour; in response to estimating the phon, determining at least one transfer function associated with the user hearing profile; computing a second sound-pressure level based on the at least one transfer function and the first frequency; generating a second audio data based on the first sound-pressure level, the second sound-pressure level, and the first frequency; and causing a speaker to emit the second audio data within an ear canal of a user, such that the user perceives the audio data as if the user has normal hearing.

In some aspects, the techniques described herein relate to a method, wherein the equal-loudness hearing profile is obtained from an external device.

In some aspects, the techniques described herein relate to a method, wherein the range of audible frequencies is 0 to 20,000 Hz and the range of sound-pressure levels is 0 to 120 decibels.

In some aspects, the techniques described herein relate to a method, wherein the user hearing profile is obtained based on an otoacoustic emission, and auditory evoked potential, or an acoustic reflex.

For purposes of summarizing the disclosure, certain aspects, advantages, and novel features are discussed herein. It is to be understood that not necessarily all such aspects, advantages, or features will be embodied in any particular embodiment of the disclosure, and an artisan would recognize from the disclosure herein a myriad of combinations of such aspects, advantages, or features.

BRIEF DESCRIPTION OF THE DRAWINGS

Example features of the present disclosure, its nature and various advantages will be apparent from the accompanying drawings and the following detailed description of various implementations. Non-limiting and non-exhaustive implementations are described with reference to the accompanying drawings, wherein like labels or reference numbers refer to like parts throughout the various views unless otherwise specified. The sizes and relative positions of elements in the drawings are not necessarily drawn to scale. For example, the shapes of various elements may be selected, enlarged, and positioned to improve drawing legibility. The particular shapes of the elements as drawn have been selected for ease of recognition in the drawings.

FIGS. 4A-4C depict an example interaction between an auricular device and various communication environments.

DETAILED DESCRIPTION

Figure 1A:
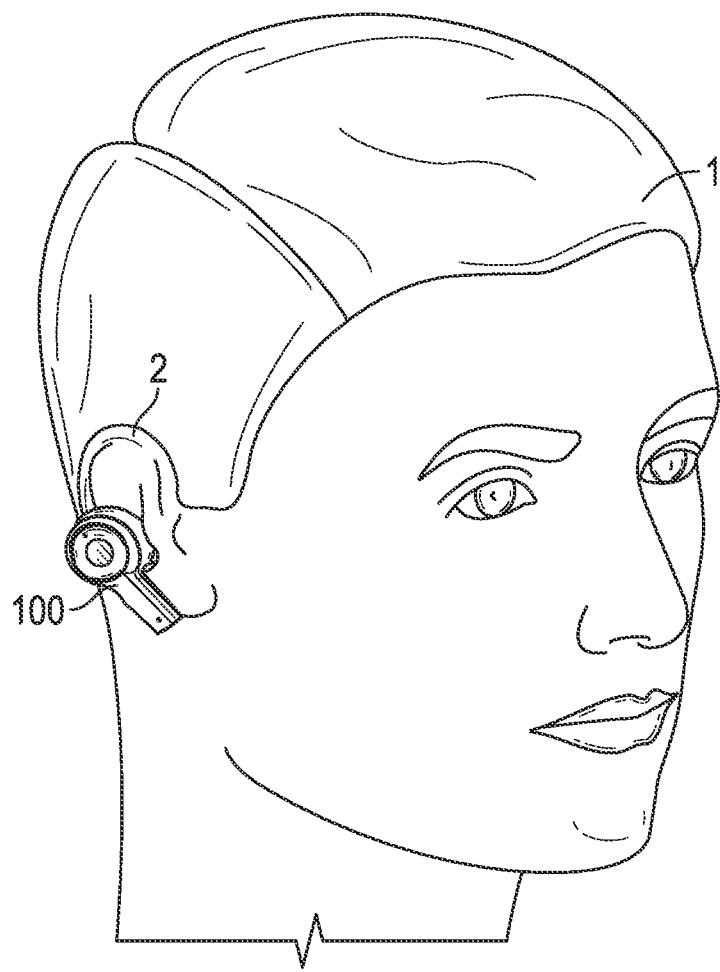
FIG. 1A illustrates an auricular device secured to an ear of a user.

Various features and advantages of this disclosure will now be described with reference to the accompanying figures. The following description is merely illustrative in nature and is in no way intended to limit the disclosure, its application, or uses. This disclosure extends beyond the specifically disclosed embodiments and/or uses and obvious modifications and equivalents thereof. Thus, it is intended that the scope of this disclosure should not be limited by any particular embodiments described below. The features of the illustrated embodiments can be modified, combined, removed, and/or substituted as will be apparent to those of ordinary skill in the art upon consideration of the principles disclosed herein.

I. Overview

Hearing loss affects almost half of the United States population over 65 years old. Aging and chronic exposure to loud noises can both contribute to hearing loss. Although there are steps to improve one's hearing, most types of hearing loss cannot be reversed. Several symptoms of hearing loss can include muffling speech and other words, difficulty understanding words especially against background noise and/or in a crowd, and trouble hearing consonants. Difficulty hearing can vary from left ear to right ear, occur gradually, and affect daily life. Typically, a patient seeking to improve their hearing may undergo a hearing test. In some examples, a hearing test can furnish audiogram data representing a patient's threshold of audibility for each of the patient's ears. The audiogram data can provide a patient with, for example, the softest sound the patient can hear at one or more frequencies. Audiogram data can be represented by a plot, including information representing a patient's threshold of audibility.

Although audiogram data implemented in an auricular device such as in a hearing aid context may be used to modify sounds above a patient's audible threshold, the audiogram data may not provide an optimal hearing response to a patient across varying sound-pressure levels and in varying environments. For example, some users may not be able to distinguish noise from a conversation, and/or may desire to perceive a sound similar to that of an average person. Accordingly, it is desirable to provide an auricular device that is configured to deliver a more effective listening experience to a user.

To resolve one or more issues mentioned above, an auricular device can be configured to generate and/or apply an equal-loudness hearing profile to modify acoustic signals to optimize a user's listening experience. The auricular device can create an equal-loudness hearing profile based on a measured response including an otoacoustic emission, auditory evoked potential, an auditory reflex, and/or the like. The equal-loudness hearing profile can further include one or more contours based on an average person's sensitivity to one or more sound-pressure levels across a frequency range. Advantageously, an equal-loudness hearing profile include one or more transfer functions based on an average person's perceived loudness level and an individual user's perceived loudness level to modify sound such that the user perceives the sound similar to and/or the same as an average person.

II. Example Aspect Related to an Auricular Device

Figure 1B:
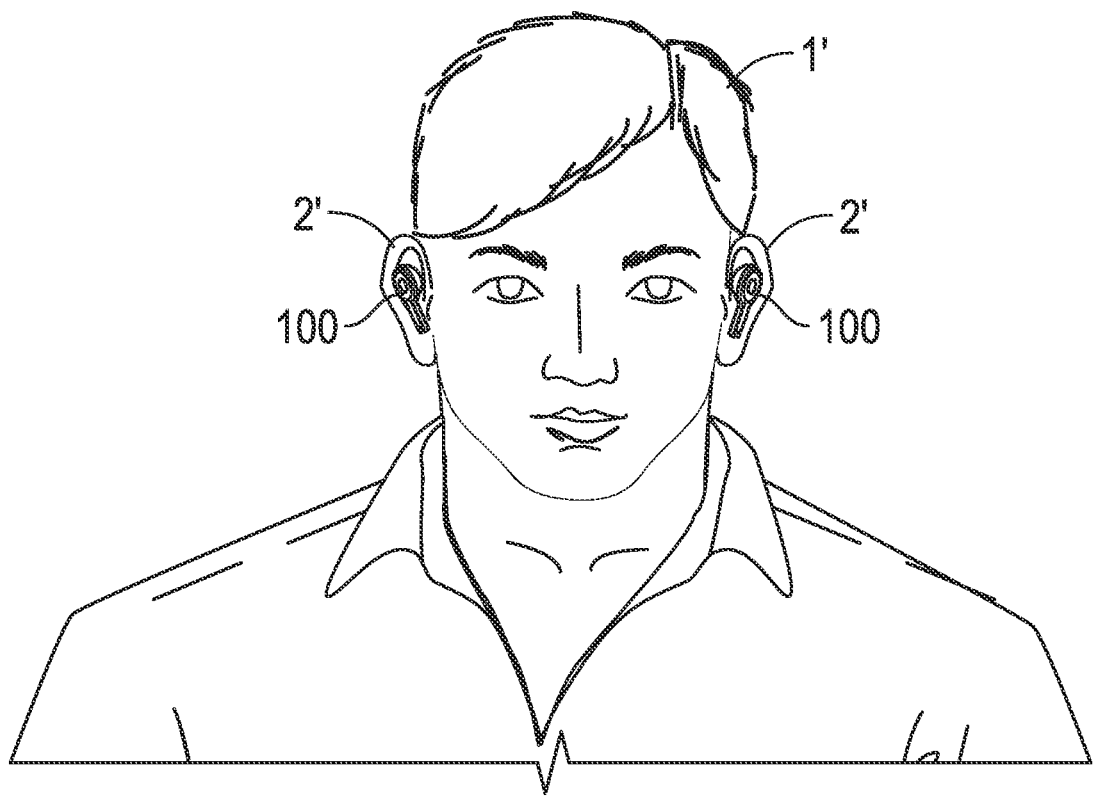
FIG. 1B illustrates a pair of auricular devices secured to ears of a user.

FIG. 1A illustrates an auricular device 100 secured to an ear 2 of a user 1 (which may also be referred to as a "subject", "wearer," and/or "patient"). Although FIG. 1A depicts an auricular device 100 secured to an ear 2 in a particular manner, such illustrated manner and/or location of securement is not intended to be limiting. FIG. 1B illustrates two auricular devices 100, one secured to each ear 2' of a user 1'. An auricular device 100 can be secured to any of a number of portions and/or locations relative to the ear 2. For example, an auricular device 100 can be secured to, placed adjacent, and/or positioned to be in contact with a pinna, a concha, an ear canal, a tragus, an antitragus, a helix, an antihelix, and/or another portion of the ear.

An auricular device 100 can be of various structural configurations and/or can include various structural features that can aid mechanical securement to any of such portions of the ear 2 and/or other portions of the user 1 (for example, on and/or near portions of a head of the user 1). In some implementations, the auricular device 100 can be similar and/or identical to and/or incorporate any of the features described with respect to any of the devices described and/or illustrated in U.S. Pat. No. 10,536,763, filed May 3, 2017, titled "Headphone Ventilation," and/or can be similar and/or identical to and/or incorporate any of the features described with respect to any of the devices described and/or illustrated in U.S. Pat. No. 10,165,345, filed Jan. 4, 2017, titled "Headphones with Combined Ear-Cup and Ear-Bud," each of which are incorporated by reference herein in their entireties and form part of the present disclosure. In some implementations, auricular device 100 can be similar and/or identical to any of the devices described in U.S. Pat. Nos. 10,536,763 and/or 10,165,345 and also includes one or more of the features described with reference to FIG. 1C below (for example, processor 102, storage device 104, communication module 106, information element 108, power source 110, oximetry sensor 112, accelerometer 114, gyroscope 116, temperature sensors 118, other sensors 120, microphones 122, and/or speakers 124).

a. Example Aspects Related to the Functionality of an Auricular Device

Figure 1C:
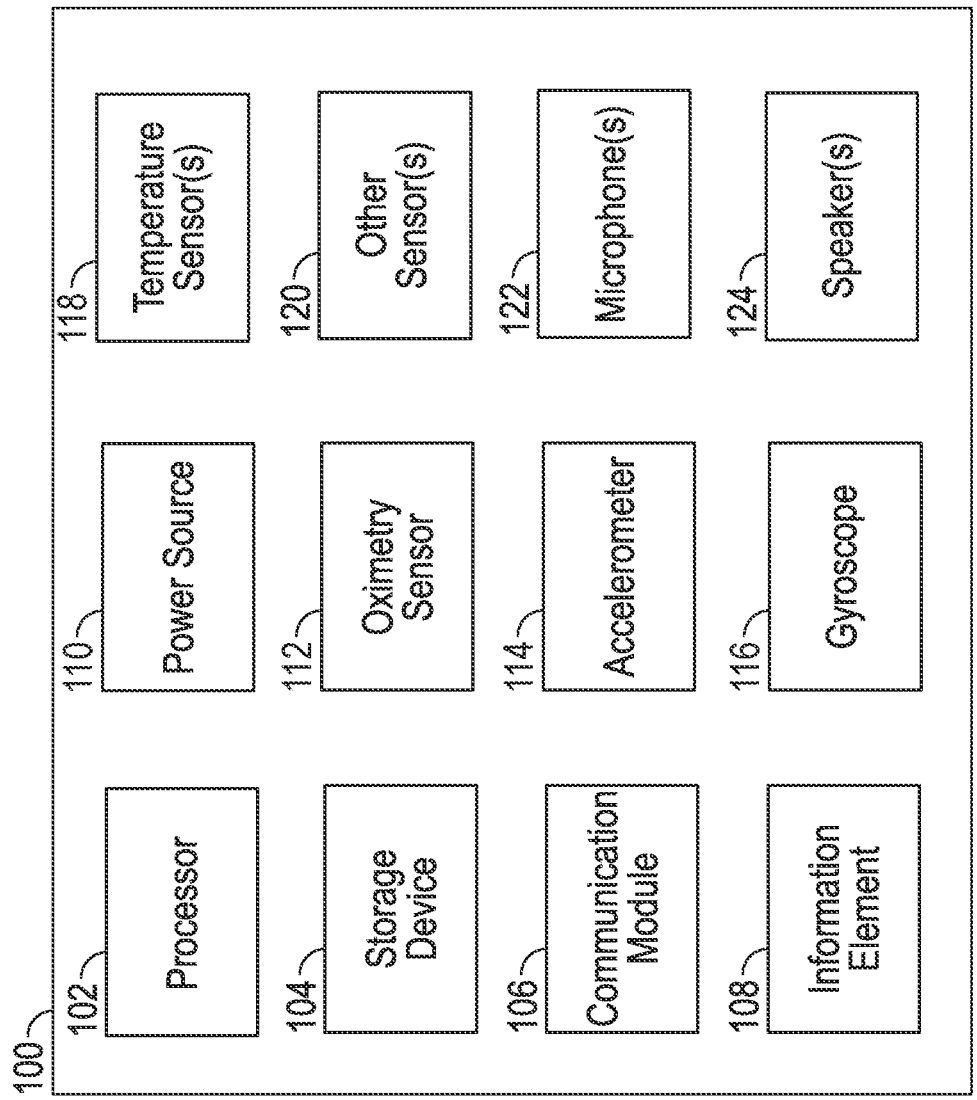
FIG. 1C illustrates a schematic diagram of certain features of the auricular device of FIGS. 1A and/or 1B.

FIG. 1C illustrates a schematic diagram of certain features which can be included in an auricular device 100. As depicted, an auricular device 100 can include any and/or all of processor 102, storage device 104, communication module 106, and/or information element 108.

A processor 102 can be configured, among other things, to process data, execute instructions to perform one or more functions, and/or control the operation of the auricular device 100. For example, a processor 102 can process physiological data obtained from the auricular device 100 and can execute instructions to perform functions related to storing and/or transmitting such physiological data. For example, the processor 102 can process data received from one or more sensors of the auricular device 100, such as any and/or all of oximetry sensor 112, accelerometer 114, gyroscope 116, temperature sensors 118, and/or any other sensors 120 of the auricular device 100. A processor 102 can execute instructions to perform functions related to storing and/or transmitting any and/or all of such received data.

In some implementations, an auricular device 100 can be configured to adjust a sized and/or shape of a portion of the auricular device 100 to secure to an ear of a user. In some implementations, the auricular device 100 can include an ear canal portion that can be configured to fit and/or secure within at least a portion of an ear canal of a user when the auricular device 100 is in use. In such implementations, the auricular device 100 can be configured to adjust a size and/or shape of such ear canal portion to secure within the user's ear canal. In some examples, the size and/or shape of an ear canal portion can be adjusted by inflating a portion of the ear canal portion, and/or via an alternative mechanical means. In some implementations, the auricular device 100 includes an ear bud configured to fit and/or secure within the ear canal of a user, and in such implementations, the auricular device 100 can be configured to inflate the ear bud (or a portion thereof) to adjust a size and/or shape of the ear bud. In some implementations, the auricular device 100 includes an air intake and an air pump coupled to an inflatable portion of the auricular device 100 (for example, of an ear bud) and configured to cause inflation in such manner.

A storage device 104 can include one or more memory devices that store data, including without limitation, dynamic and/or static random-access memory (RAM), programmable read-only memory (PROM), erasable programmable read-only memory (EPROM), electrically erasable programmable read-only memory (EEPROM), and the like. Such stored data can be processed and/or unprocessed physiological data and/or other types of data (for example, motion and/or location data) obtained from the auricular device 100, for example. In some implementations, a storage device 104 can store information indicative and/or related to one or more users 1. For example, in some implementations of the auricular device 100 that are configured to cause inflation of a portion of the auricular device 100 within a user's ear canal as discussed above, the storage device 104 can store information related to a user inflation profile that can be utilized by the auricular device 100 to cause adjustment of a size and/or shape of such inflatable portion within the user's ear to a certain amount. In some implementations, as discussed elsewhere herein, the auricular device 100 can be configured to store information regarding one or more hearing profiles of users, and such information can be stored in storage device 104.

A communication module 106 can facilitate communicate (via wires and/or wireless connection) between an auricular device 100 (and/or components thereof) and separate devices, such as separate monitoring and/or mobile devices. For example, a communication module 106 can be configured to allow an auricular device 100 to wirelessly communicate with other devices, systems, and/or networks over any of a variety of communication protocols. A communication module 106 can be configured to use any of a variety of wireless communication protocols, such as Wi-Fi (802.11x), Bluetooth®, ZigBee®, Z-wave®, cellular telephony, infrared, near-field communications (NFC), RFID, satellite transmission, proprietary protocols, combinations of the same, and the like. A communication module 106 can allow data and/or instructions to be transmitted and/or received to and/or from the auricular device 100 and separate computing devices. A communication module 106 can be configured to transmit (for example, wirelessly) processed and/or unprocessed physiological and/or other information to a separate computing devices, which can include, among others, patient monitor (such as patient monitor discussed below), a mobile device (for example, an iOS and/or Android enabled smartphone, tablet, laptop), a desktop computer, a server and/or other computing and/or processing device for display and/or further processing, among other things. Such separate computing devices can be configured to store and/or further process the received physiological and/or other information, to display information indicative of and/or derived from the received information, and/or to transmit information—including displays, alarms, alerts, and notifications—to various other types of computing devices and/or systems that may be associated with a hospital, a caregiver (for example, a primary care provider), and/or a user (for example, an employer, a school, friends, family) that have permission to access the user's data. As another example, the communication module 106 of the auricular device 100 can be configured to wirelessly transmit processed and/or unprocessed obtained physiological information and/or other information (for example, motion and/or location data) to a mobile phone which can include one or more hardware processors configured to execute an application that generates a graphical user interface displaying information representative of the processed and/or unprocessed physiological and/or other information obtained from the auricular device 100. A communication module 106 can be and/or include a wireless transceiver.

In some implementations, an auricular device 100 includes an information element 108. An information element 108 can be a memory storage element that stores, in non-volatile memory, information used to help maintain a standard of quality associated with the auricular device 100. Illustratively, an information element 108 can store information regarding whether the auricular device 100 has been previously activated and whether the auricular device 100 has been previously operational for a prolonged period of time, such as, for example, one, two, three, four, five, six, seven and/or eight or more hours. The information stored in the information element 108 can be used to help detect improper re-use of the auricular device 100, for example.

With continued reference to FIG. 1C, the auricular device 100 can include a power source 110. Power source 110 can be, for example, a battery. Such battery can be rechargeable and/or non-rechargeable. A power source 110 can provide power for the hardware components of the auricular device 100 described herein. The power source 110 can be, for example, a lithium battery. Additionally, and/or alternatively, the auricular device 100 can be configured to obtain power from a power source that is external to the auricular device 100. For example, the auricular device 100 can include and/or can be configured to connect to a cable which can itself connect to an external power source to provide power to the auricular device 100. In some implementations, the auricular device 100 does not include power source 110.

b. Example Aspect Related to Physiological Sensors of an Auricular Device

An auricular device 100 can include various sensors for determination of physiological parameters and/or for generating signals responsive to physiological characteristics of a user. For example, as depicted in FIG. 1C, an auricular device 100 can include any and/or all of an oximetry sensor 112 and/or temperature sensors 118.

The oximetry sensor 112 (which may also be referred to as an "optical sensor") can include one or more emitters and one or more detectors for obtaining physiological information indicative of one or more blood parameters of a user. These parameters can include various blood analytes such as oxygen, carbon monoxide, methemoglobin, total hemoglobin, glucose, proteins, glucose, lipids, a percentage thereof (for example, concentration and/or saturation), and the like. The oximetry sensor 112 can also be used to obtain a photoplethysmograph, a measure of plethysmograph variability, pulse rate, a measure of blood perfusion, and the like. Information such as oxygen saturation (SpO2), pulse rate, a plethysmograph waveform, respiratory effort index (REI), acoustic respiration rate (RRa), EEG, ECG, pulse arrival time (PAT), perfusion index (PI), pleth variability index (PVI), methemoglobin (MetHb), carboxyhemoglobin (CoHb), total hemoglobin (tHb), glucose, can be obtained from oximetry sensor 112 and data related to such information can be transmitted by the auricular device 100 (for example, via communication module 106) to a separate computing device (such as a patient monitor and/or mobile phone). An auricular device 100 can be configured to operably position the oximetry sensor 112 (for example, emitter(s) and/or detector(s) thereof) proximate and/or in contact with various portions of an ear of a user when the auricular device 100 is secured to the ear, including but not limited to, a pinna, a concha, an ear canal, a tragus, an antitragus, a helix, an antihelix, and/or another portion of the ear.

An auricular device 100 can include temperature sensors 118. For example, the auricular device 100 can include one or more (such as one, two, three, four, five, six, seven and/or eight or more) temperature sensors 118 that are configured to determine temperature values of the user and/or that are configured to generate and/or transmit signal(s) based on detected thermal energy of the user to processor 102 for determination of temperature value(s). An auricular device 100 can be configured to operably position the temperature sensors 118 proximate and/or in contact with various portions of an ear of a user when the auricular device 100 is secured to the ear, including but not limited to, a pinna, a concha, an ear canal, a tragus, an antitragus, a helix, an antihelix, and/or another portion of the ear. As an alternative and/or as an addition to the temperature sensors 118 configured to determine body temperature values and/or to generate signals responsive to thermal energy to processor 102 for temperature determination, the auricular device 100 can include one or more additional temperature sensors for measuring ambient temperature. For example, the auricular device 100 can include temperature sensors 118 for determining temperature values of the user, and temperature sensors 118 for determining ambient temperature. In some implementations, the auricular device 100 (for example, the processor 102) can determine a modified, adjusted temperature value of the user based on (for example, comparisons) of data received from both types of temperature sensors. For example, in some implementations, the auricular device 100 includes temperature sensors 118 configured to be positioned proximate and/or in contact with portions of the user's ear when the device 100 is secured thereto (which may be referred to as "skin" temperature sensors) and also temperature sensors 118 configured to be positioned away from and/or to face away from skin of the user when the device 100 is secured to the ear for determining ambient temperature (which may be referred to as "ambient" temperature sensors).

As another example, in some implementations, the auricular device 100 includes one or more of such ambient temperature sensors which are operably positioned at and/or near a side and/or surface of the auricular device 100 that faces away from the user, for example, away from skin and/or ear of the user, and/or away from any portion of the ear such as those discussed herein. As discussed further below, in some implementations, a portion of the auricular device 100 can be configured to be positioned and/or secured within an ear canal of the user when the auricular device 100 is in use, and in such implementations, the auricular device 100 can include temperature sensors 118 on such portion.

c. Example Aspects Related to Motion Sensors of an Auricular Device

With reference to FIG. 1C, the auricular device 100 can include an accelerometer 114. The accelerometer 114 can be, for example, a three-dimensional (3D) accelerometer. Further, the auricular device 100 can include a gyroscope 116.

An auricular device 100 can include at least one inertial measurement unit (herein "IMU") for measuring motion, orientation, and/or location of a user (e.g., one or more of a combination of accelerometer 114 and/or gyroscope 116). An IMU can be configured to determine motion, orientation, position and/or location of a user. Further, the processor 102 may be configured to received motion, orientation, position, and/or location data of a user from at least one IMU. Additionally, the processor 102 may determine motion, orientation, position, and/or location of a user based on data received from at least one IMU. For example, the auricular device 100 can include an IMU that can measure static and/or dynamic acceleration forces and/or angular velocity. By measuring static and/or dynamic acceleration forces and/or angular velocity, an IMU can be used to calculate movement and/or relative position of auricular device 100. The IMU can include one or more, and/or a combination of, for example, an AC-response accelerometer (e.g., a charge mode piezoelectric accelerometer and/or a voltage mode piezoelectric accelerometer), a DC-response accelerometer (for example, capacitive accelerometer, piezoresistive accelerometer), a microelectromechanical system (MEMS) gyroscope, a hemispherical resonator gyroscope (HRG), vibrating structure gyroscope (VSG), a dynamically tuned gyroscope (DTG), fiber optic gyroscope (FOG), a ring laser gyroscope (RLG), and/or the like. An IMU can measure acceleration forces and/or angular velocity forces in one-dimension, two-dimensions, and/or three-dimensions. With calculated position and movement data, users 1 of auricular device 100 and/or others (for example, care providers) may be able to map the positions and/or movement vectors of the auricular device 100. Any number of IMU's can be used to collect sufficient data to determine position and/or movement of the auricular device 100. Further, auricular device 100 can be configured to determine and/or keep track of steps and/or distance traveled by a user based on data from at least one IMU (e.g., one or more of a combination of accelerometer 114, gyroscope 116).

Incorporating at least one IMU (for example, one or more of a combination of accelerometer 114 and/or gyroscope 116) in the auricular device 100 can provide a number of benefits. For example, the auricular device 100 can be configured such that, when motion is detected (for example, by the processor 102) above a threshold value, the auricular device 100 stops determining and/or transmitting physiological parameters. As another example, the auricular device 100 can be configured such that, when motion is detected above and/or below a threshold value, the oximetry sensor 112 and/or temperature sensors 118 are not in operation and/or physiological parameters based on oximetry sensors 112 and/or temperature sensors 118 are not determined, for example, until motion of the user falls below such threshold value. This can advantageously reduce and/or prevent noise, inaccurate, and/or misrepresentative physiological data from being processed, transmitted, and/or relied upon. Additionally, auricular device 100 can be configured such that, when motion is detected (for example, by the processor 102) above a threshold value, the auricular device 100 begins determining and/or transmitting physiological parameters.

Some implementations of auricular device 100 can interact and/or be utilized with any of the physiological sensors and/or systems of FIG. 1C to determine whether a user has fallen. For example, orientation and/or motion data can be obtained from an auricular device 100 and/or a body worn sensor to determine whether a user has fallen. As another example, an auricular device 100 and/or any of the body worn sensors can communicate with a separate device.

d. Example Aspects Related to Additional Sensors of an Auricular Device

With continued reference to FIG. 1C, an auricular device 100 can include other sensors 120. Other sensors 120 can be, for example, a moisture sensor, an impedance sensor, an acoustic/respiration sensor, an actimetry sensor, an EEG sensor, and/or an ECG sensor, among others. An auricular device 100 can include a housing which encloses and/or hold any of the components described above with respect to FIG. 1C, among others. In some implementations, the auricular device 100 can be similar and/or identical to and/or incorporate any of the features and/or sensors described with respect to any of the devices described and/or illustrated in U.S. Pat. No. 9,497,530, filed May 13, 2016, titled "Personalization of Auditory Stimulus," which is incorporated by reference herein its entirety and forms part of the present disclosure.

c. Example Aspects Related to Audio Components of an Auricular Device

An auricular device 100 can include various software and/or hardware components to allow the auricular device 100 to improve hearing of a user and function as, for example, a hearing aid and/or an ear bud. For example, as depicted in FIG. 1C, the auricular device 100 can include microphones 122 (such as one, two, three, four, five, and/or six or more microphones) and/or speakers 124 (such as one, two, three, four, five, and/or six or more speakers). The microphones 122 can be configured to detect ambient sound, for example, outside the user's ear. The microphones 122 can be operably positioned by the auricular device 100 in a variety of locations, for example, on surface(s) of the auricular device 100 that face away from the user (for example, away from the user's ear, face, and/or neck) when the auricular device 100 is in use (for example, is secured to the user's ear). In some implementations, the microphones 122 can convert detected ambient sound to digital signals for analysis and/or processing.

The speakers 124 can be configured to output sound into and/or toward the user's ear. The speakers 124 can be operably positioned by the auricular device 100 in a variety of locations, for example, on a portion and/or portions of the auricular device 100 that face toward the user when the auricular device 100 is in use. For example, the speakers 124 can be operably positioned by the auricular device 100 to direct output sound within and/or toward the ear canal of the user. In some implementations, the speakers 124 are positioned on and/or along an ear canal portion of the auricular device 100 that may be positioned within the user's ear canal when the auricular device 100 is in use.

f. Example Aspects Related to Operating Modes of an Auricular Device

In some implementations, the auricular device 100 may be configured to modify one or more characteristics of ambient sound detected by the microphones 122. For example, the auricular device 100 can be configured to modify one or more frequencies of ambient sound detected by the microphones 122. For example, the auricular device 100 can be configured to increase and/or decrease one or more frequencies associated with sound detected by the microphones 122, and can communicate such modified frequencies to the speakers 124 for outputting to the user. This can be significantly advantageous for many persons experiencing hearing impairments who are unable to hear certain frequencies and/or frequency ranges of sound. Any of such above-described frequency modification can be carried out by one or more processors of the auricular device 100 that can be similar and/or identical to processor 102. In some implementations, the processor 102 can be configured to carry out such above-described frequency modification. As discussed elsewhere herein, the auricular device 100 can be configured to communicate (for example wirelessly communicate) with separate devices, such as a mobile phone. In some implementations, the auricular device 100 (for example, the processor 102) can be configured to determine and output text to such separate device based upon the sound detected by the microphones 122. In some cases, the auricular device 100 (for example, the processor 102) can be configured to modify one or more characteristics of ambient sound detected by the microphones 122 based upon a hearing profile of a user. An auricular device 100 can be configured to store one or more and/or a plurality of hearing profiles (for example, each associated with a particular user) in storage device 104 of the auricular device 100. Alternatively and/or additionally, the auricular device 100 can be configured to receive (for example, wirelessly receive) one or more hearing profiles from a separate computing device (for example, a mobile phone). For example, one or more hardware processors of such separate device (for example, a mobile phone) can execute an application (e.g., software application, web and/or mobile application, etc.) that can execute commands to enable the separate computing device to transmit a hearing profile to the auricular device 100 for use by the auricular device 100 and/or to instruct the auricular device 100 to employ the hearing profile to carry out modification of one or more characteristics of detected sound for the user (for example, frequency modification).

In some cases, the auricular device 100 can be configured to modify sound detected by the microphones 122 prior to outputting the sound by the speakers 124. For example, in some implementations, the auricular device 100 include an amplifier configured to amplify (for example, increase a strength of) sound detected by the microphones 122 and/or modify one or more signals generated by the microphones 122 based upon detected sound. In some implementations, the processor 102 can be configured to convert sound detected by the microphones 122 into digital signals, for example, before processing and/or before transmission to the speakers 124.

In some implementations, the auricular device 100 can be configured to receive acoustic signals from a separate device (e.g., electronic data representing sound) and emit sound (for example, via speakers 124) based on the received acoustic signals. In such configurations, the auricular device 100 can function as an audio playback device. An auricular device 100 can include various software and/or hardware components to allow the auricular device 100 to carry out such audio functions. In some cases, the auricular device 100 may be configured to provide noise cancellation to block out ambient sounds when the auricular device 100 is facilitating audio playback.

An auricular device 100 can be configured to operate in various modes. For example, in some implementations, the auricular device 100 can be configured to operate in a music and/or audio playback mode where the auricular device 100 facilitates emission of sound to the user's ear via speakers 124 based on received acoustic signals from a separate device. An auricular device 100 can also operate in a hearing aid mode where the auricular device 100 can modify one or more characteristics of a received acoustic signal (e.g., ambient sound) detected by the microphones 122. Additionally, the auricular device 100 can be configured to operate in an enhanced hearing mode, wherein the auricular device 100 receives and acoustic signal from, for example the microphones 122 and/or an acoustic signal from a separate computing device and modifies (e.g., amplify, attenuate, suppress, emphasize, and/or make frequency-specific adjustments for amplitude and phase of sound) the acoustic and/or acoustic signal according to a hearing profile. In some cases, the auricular device 100 can be configured to operate in only one of such modes and/or be configured to switch between these modes. As discussed elsewhere herein, the auricular device 100 can be configured to communicate (for example wirelessly communicate) with separate devices, such as a mobile phone. In some implementations, the auricular device 100 may be configured for communication with a separate computing device (for example, mobile phone) that may be configured to execute an application (e.g., software application, web and/or mobile application, etc.) that can execute commands to enable the separate computing device to instruct the auricular device 100 to employ one of a plurality of modes of auricular device 100 (for example, the audio playback mode, hearing aid mode, and/or enhanced hearing mode).

III. Example Aspects Related to Hearing Profile(s) for an Auricular Device

As discussed above, the auricular device 100 can include one or more operating modes configured to offer a user a more personalized hearing experience. An auricular device 100 may include one or more hearing profiles as part of one or more operating modes. One or more hearing profiles can be individualized for a user of an auricular device 100. The hearing profiles can be stored on auricular device 100, for example, in storage device 104 and accessed by the processor 102. Additionally, the processor 102 may receive from a separate computing device (e.g., any of the devices in FIGS. 4A-4C), one or more hearing profiles of one or more users. In an example implementation, a hearing profile can be represented by a computer-executable program and/or routine, which may include a plurality of transfer functions. A transfer function can be used by the processor 102, to modify a received acoustic signal (e.g., sound) such that the user's hearing is improved.

In an example implementation, the processor 102 may receive an acoustic signal from the microphones 122 and/or from one or more separate computing devices wirelessly connected to the auricular device 100. The processor 102 may modify the received acoustic signal based on the user's hearing profile and transmit the modified signal to the speakers 124 such that the user hears the modified acoustic signal.

In an example implementation, the auricular device 100 can include at least three types of hearing profiles. The at least three types of hearing profiles can include a normal hearing profile, an audiogram profile, and an equal-loudness profile. In another implementation, the auricular device 100 may be configured to combine at least one or more hearing profiles and/or operate one or more hearing profiles at the same time. In an example implementation, the processor 102 may be configured to receive a request, (e.g., from a mobile device 400A and/or watch 400B) to change the hearing profile of the auricular device 100 from a first hearing profile to a second hearing profile.

In some implementations, the auricular device 100 can be similar and/or identical to and/or incorporate any of the features and/or sensors described with respect to any of the devices described and/or illustrated in U.S. Pub. No. 2022/0070604, published Mar. 3, 2022, titled "Audio Equalization Metadata," which is incorporated by reference herein its entirety and forms part of the present disclosure.

In some implementations, the auricular device 100 can be configured to measure and determine a hearing profile of a user. For example, the auricular device 100 can emit audio via speakers 124 and receive a response to the emitted audio via microphones 122. Further, the response can be measured via processor 102 to determine a hearing profile. In some examples, the measured response can be an otoacoustic emission (OAE), an auditory evoked potential (AEP), an acoustic reflex, etc. OAE is a low-level sound emitted by the cochlea either spontaneously or evoked by an auditory stimulus. AEP is a type of EEG signal emanated from the brain through the scalp in response to an acoustic stimulus. Auricular device 100 can measure any AEP, such as auditory brainstem response, mild latency response, cortical response, acoustic change complex, auditory steady state response, complex auditory brainstem response electrocochleography, cochlear microphonic, or cochlear neurophonic AEP. The acoustic reflex (also known as the stapedius reflex, middle-ear muscles (MEM) reflex, attenuation reflex, or auditory reflex) is an involuntary muscle contraction that occurs in the middle ear in response to high-intensity sound stimuli or when the person starts to vocalize.

a. Example Aspects Related to a Typical Hearing Profile

An auricular device 100 can include a "normal" (e.g., no gain) profile. An auricular device 100 using a normal profile may be configured to receive and modify an acoustic signal and transmit the processed acoustic signal to speakers 124, wherein the modified acoustic signal, when emitted from speakers 124, has the same and/or a similar sound-pressure level as the received acoustic signal. In a normal profile, the processor 102 may apply modify the received signal slightly, applying little to no gain to the received acoustic signal before transmitting the modified acoustic signal to speakers 124. Thus, the hearing transfer function of a normal hearing profile may be linear (a gain close to 1) across the frequency spectrum of a user. Consequently, a user experiencing hearing loss may not be able to hear a full spectrum of tones, because as auricular device 100 hearing profile may not modify an acoustic signal to overcome the user's effects of hearing loss.

b. Example Aspects Related to an Audiogram Hearing Profile

An auricular device 100 can include an audiogram hearing profile. An auricular device 100 using an audiogram hearing profile may be configured to operate with one or more hearing profiles based on a transfer function generated from audiometric information of the user. The audiometric information can originate from, for example, an audiogram test. An audiogram test may typically be used to determine a user's threshold hearing audibility (whether the user can hear).

In an example implementation, an auricular device 100 may execute an audiogram test to determine a user's threshold of audibility. During an audiogram test, the auricular device 100 may generate tones with varying amplitudes as chosen by a user and/or a hearing specialist. The tones may be delivered to the user's ear while using auricular device 100. The user may indicate when a tone is heard, for example, by pressing a feedback button and/or by a visual signal to the operator. The result of the test, (e.g., audiometric information) across the typical frequencies of, for example 20 to 20,000 Hz, may be stored on the storage device 104 of the auricular device 100. Processor 102 may determine a transfer function representing the user's threshold of audibility based on the generated audiometric information. In another example implementation, processor 102 can receive audiometric information from a separate computing device and determine a transfer function for the user based on the received audiometric information. In another implementation, processor 102 can receive an audiogram hearing profile including a transfer function, representative of the results of an audiogram test.

A user operating an auricular device 100 with the audiogram hearing profile may be able to hear tones of lower sound-pressure levels than that of a user operating an auricular device 100 with, for example, a normal hearing profile. While applying an audiogram hearing profile, processor 102 may receive an acoustic signal (e.g., from microphones 122 and/or from a separate computing device) below the user's threshold of audibility. Processor 102 may modify the received acoustic signal in accordance with the audiogram hearing profile's transfer function, and transmit the modified acoustic signal to speakers 124 such that speakers 124 generate a sound above the user's threshold of audibility.

Although the audiogram hearing profile offers benefits to a user desiring to hear sounds below their individual threshold of audibility, audiogram hearing profiles may have several shortcomings. For example, an audiogram hearing profile does not compensate for a user's perceived loudness of a tone across the frequency spectrum. For this reason, an audiogram hearing profile, as applied to enhance the hearing of a user can be less than ideal in at least some respects when considering the optimal hearing profile of a user.

c. Example Aspects Related to an Equal-Loudness Hearing Profile

In an equal-loudness hearing profile, the auricular device 100 can be configured to offer a user a more personalized hearing experience when compared to other hearing profiles such as the normal hearing profile and/or the audiogram hearing profile. The equal-loudness hearing profile may apply a user's specific transfer function along with an equal-loudness contour to a received acoustic signal from, for example, the microphones 122 and/or a separate computing device. Using an equal-loudness hearing profile, the auricular device 100 may modify a received acoustic signal based on a plurality of transfer functions representative of the user's equal-loudness hearing profile. Advantageously, the equal-loudness hearing profile enables the auricular device 100 to tune acoustic signals across the entire dynamic range of the user such that the user perceives an acoustic signal the same and/or similar to that of an average person.

An equal-loudness hearing profile can differ from one or more of the hearing profiles mentioned herein. For example, an equal-loudness hearing profile may allow the user to distinguish between noise and conversation at levels above the user's threshold of audibility, for example at high and low frequency ranges, compared to using a normal hearing profile and/or an audiogram hearing profile because the equal-loudness hearing profile may modify soft sounds across the full hearing spectrum (e.g., 20-20,000 Hz) above the user's threshold of audibility.

An auricular device 100 may determine a plurality transfer functions for a user's equal-loudness hearing profile by testing the user's hearing. In an example implementation, an auricular device 100 may automatically generate a hearing profile (e.g., one or more transfer functions and/or the like) based on an OAE, AEP, auditory reflex, and/or the like. During a hearing test, the auricular device 100 may generate tones with varying frequencies as chosen by a user and/or a hearing specialist. The tones may be delivered to the user's ear while using auricular device 100. Microphones 122 may receive a response form the ear of a user in accordance with one or more characteristics of a user's hearing.

In an example implementation, a user's hearing profile can be created manually by the user. For example, the auricular device 100 can receive from a separate computing device (e.g., mobile device 400A), a command to enter a hearing test mode. An auricular device 100 may request that the separate computing device display a test graphical interface, prompting the user to initiate a hearing test. Once the auricular device 100 receives a request to initiate a hearing test, the auricular device 100 may transmit, via speakers 124 for example, at least one or more test acoustic signals in accordance with a predefined hearing test sequence.

In an example implementation, the transmitted test acoustic signals can be acoustic signals at a given amplitude (for example at 10 dB, 20 dB, 40 dB and/or any other dB level). Additionally, the transmitted test acoustic signals can be at one or more frequencies within a frequency range (e.g., 20 Hz to 20,000 Hz). In some implementations, the transmitted test acoustic signal can include a first test acoustic signal (e.g., reference tone) having a first amplitude and first frequency (for example, 60 dB at 1000 Hz), and a second test acoustic signal having the first amplitude and a second frequency (e.g., plus and/or minus 100 Hz, 1000 Hz 5000 Hz from the reference frequency). Advantageously, the auricular device 100 can prompt the user to respond to a set of questions displayed on the graphical interface of a mobile device 300A, wherein the set of questions correspond to each of the varying test acoustic signals. The user selection may be used to generate one or more equal-loudness transfer functions for the user's equal-loudness hearing profile.

In another implementation, an auricular device 100 may output a reference acoustic signal having a first sound-pressure level (e.g., 60 dB) and a first frequency (e.g., 1000 Hz). An auricular device 100 may output a second acoustic signal having the first sound-pressure level (e.g., 60 dB) and a second frequency (200 Hz). An auricular device 100 may request, via a separate computing device, that the user determine whether the perceived loudness of the second acoustic signal may be less than, greater than, and/or equal to the perceived loudness of the reference acoustic signal. An auricular device 100 may receive a selection from the user corresponding to the user's perceived loudness of the acoustic signals. In a further implementation, the auricular device 100 may be configured with microphones 122, wherein the auricular device may receive a response form the user via voice recognition.

The hearing test can be repeated one or more times by the auricular device varying the sound-pressure level and frequency of the tone until the auricular device 100 obtains a full dynamic response of the user.

The results of a hearing test may be stored on the storage device 104 of the auricular device 100. Processor 102 may determine a plurality of transfer functions representing the user's equal-loudness hearing profile based on results from one or more hearing tests. In an example implementation, processor 102 can receive, from a separate computing device, results of an equal-loudness test. In another implementation, processor 102 can receive a hearing profile including a plurality of transfer functions, representative of the results of an equal-loudness test.

IV. Example Aspects Related to Implementing One or More Hearing Profiles

FIGS. 2A-2E depict graphical representations of one or more hearing profiles that may be generated and/or stored by an auricular device 100. In some examples, the hearing profiles can be received from a separate computing device and/or generated by a processor 102 as described herein. In some implementations, the hearing profiles can be the result of one or more hearing tests conducted by an auricular device.

Figure 2A:
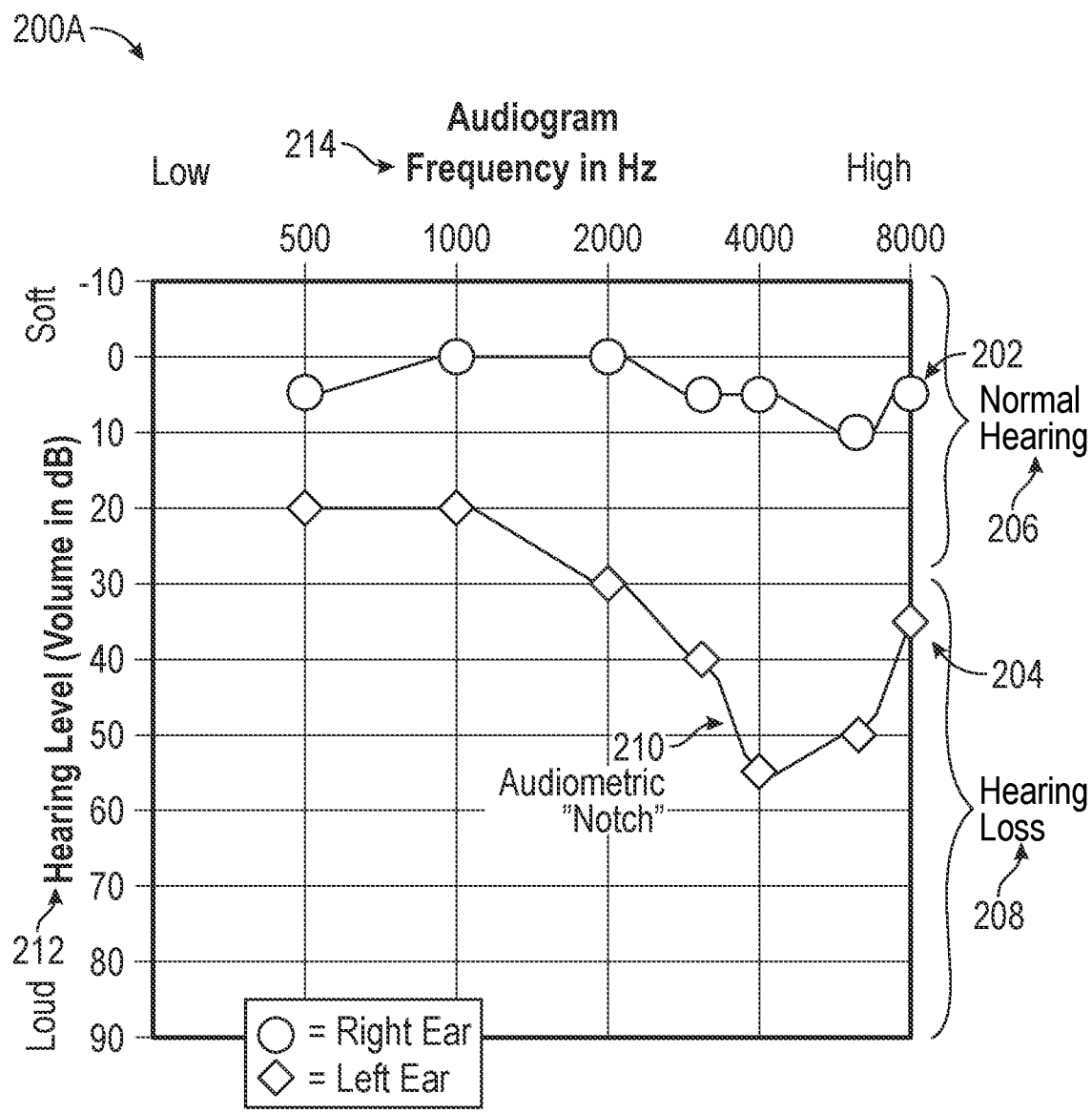
FIG. 2A illustrates an example chart of an audiogram for a user's left and right ear.

FIG. 2A illustrates a, example chart 200A including audiogram data for a right ear 202 and left ear 204 of a user plotted for a frequency range 214. Chart 200A can depict audiogram data as a result of an audiogram test conducted by, for example, auricular device 100 of FIG. 1C. In some implementations, left ear 204 and right ear 202 plots may be representative of audiometric information used to generate a transfer function for a user's audiogram hearing profile (e.g., a hearing profile generated by processor 102). As illustrated in chart 200A, a frequency range 214 for audiogram hearing data can be from about 0 to 8000 Hz. In some implementations, a frequency range 214 can be more and/or less than the range indicated in chart 200A. For example, frequency range 214 can be 500-4,000 Hz, 0-20,000 Hz, 7,000-10,000 Hz, and/or the like). Chart 200A can include a volume 212 represented in decibels (dB) for an audiogram test performed across a frequency range 214 by an auricular device 100. As illustrated, the volume 212 can be from approximately-10 dB to approximately 90 dB. In some implementations, the volume 212 displayed can be more and/or less.

With continued reference to chart 200A, the right ear 202 may experience little to no hearing loss across a frequency range 214. For example, the user appears to experience approximately 5 dB hearing loss at 500 Hz and approximately 10 dB hearing loss at about 7,000 Hz. Further, the right ear 202 may be within a normal hearing range 206 (e.g., normal hearing range 206 may include, for example, less than an approximate 25 dB loss in hearing). In some examples, an auricular device 100 can generate a hearing profile (e.g., modify an acoustic signal) for one or more frequencies in accordance with a user's audiogram data. In some implementations, an auricular device 100 may not modify acoustic signals when a user's audiogram data is within a normal hearing range 206 (e.g., hearing loss 208 may include, for example, in excess of 25 dB). In an example implementation, an auricular device 100 may generate one or more transfer functions based on audiometric data for a right ear 202. A transfer function based on audiometric data for a right ear 202 may modify acoustic signals at and/or near 0-10 dB across the frequency range 214 and/or may not modify acoustic signals when the user's hearing is within a normal hearing range 206.

In contrast to the right ear 202, a plot of the left ear 204 indicates that the user experiences hearing loss 208. For example, audiogram data based the left ear 204 indicates that the user experiences about 55 dB of hearing loss at 4,000 Hz. Further, the audiogram data indicates that the left ear 204 includes an audiometric notch 210. An audiometric notch 210 can indicate that the user experiences hearing loss across a continuous range of frequencies. As depicted in chart 200A, the left ear 204 experiences hearing loss in the range from approximately 2,000 Hz to 8,000 Hz (e.g., an approximate range for an audiometric notch 210). In an example implementation, an auricular device 100 can generate a hearing profile for a left ear 204 that modifies acoustic signals within, for example, an audiometric notch 210 (e.g., an auricular device 100 can modify acoustic signals within an audiometric notch 210).

Figure 2B:
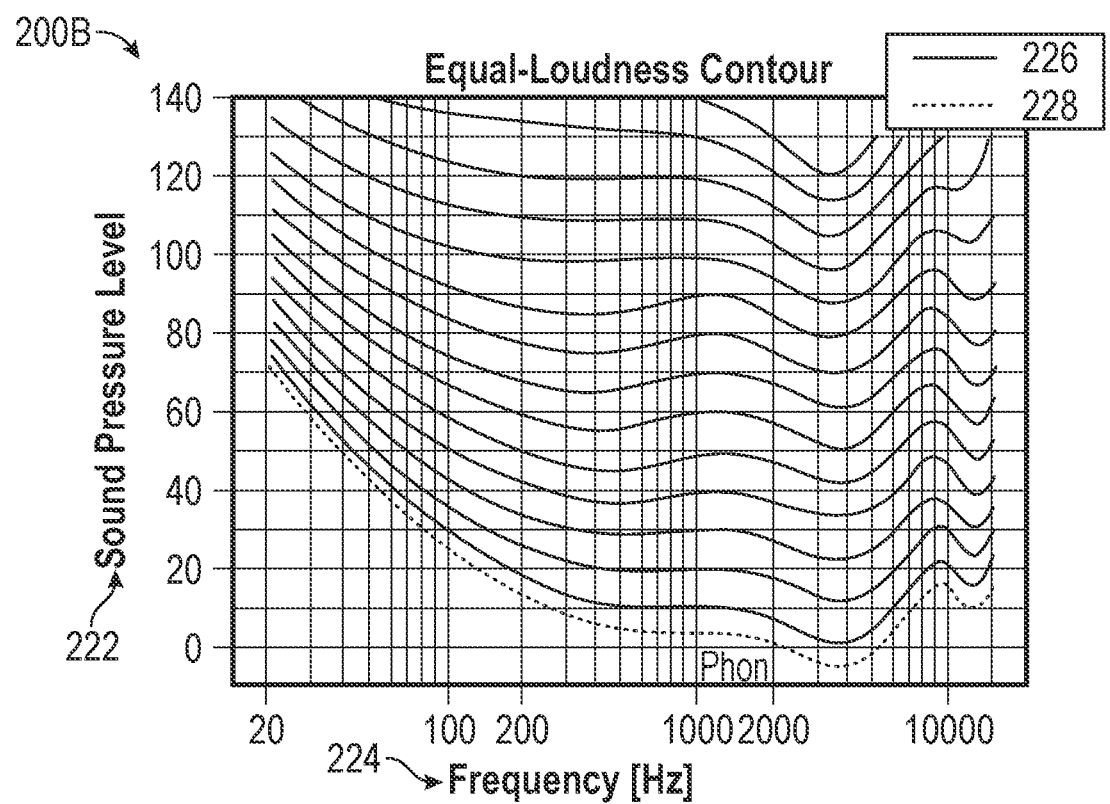
FIG. 2B illustrates an example chart of equal-loudness contours for an average person.

FIG. 2B illustrates a chart 200B displaying example equal-loudness contours 226 (e.g., as set forth in the international standard ISO 226:2003 entitled "Acoustics—Normal equal-loudness level contours."). The chart 200B can represent, for example, an average person's perceived loudness for one or more frequencies and sound-pressure levels. Advantageously, chart 200B can represent one or more contours that may be used by an auricular device 100 to modify one or more acoustic signals based on an equal-loudness hearing profile.

Chart 200B depicts sound-pressure level 222 and a frequency range 224. The sound-pressure level 222 can be, for example, from 0 to approximately 140 dB. In some examples, the frequency range 224 can be from approximately 0 Hz to 10,000 Hz. In some examples, the frequency range 224 can be more and/or less. Loudness may be measured (e.g., determined and/or estimated by processor 102 of an auricular device 100) in units of phon. A phon is a unit of loudness level used to quantify a perceived loudness of a sound. The loudness level in phons is designed to be perceptually equivalent to an actual loudness perceived by an average human ear. Phons are based on the equal-loudness contours 226 as described below. One phon is defined as the loudness level of a 1 kHz tone at a sound-pressure level of 1 dB. Phons are used to provide a perceptual representation of loudness in comparison to measurements in decibels. As an illustrative example, if a sound is measured at 40 phons, it means that the loudness of that sound is perceived by the average listener as equivalent to a 1 kHz tone at a sound-pressure level of approximately 40 dB.

Chart 200B further depicts equal-loudness contours 226. Contours 226 can represent the relationship between sound frequency and the perceived loudness or sensitivity of a human ear. Contours 226 illustrate the varying sensitivity of human auditory system to different frequencies at constant perceived loudness levels. Chart 200B also includes a threshold of audibility 228. The threshold of audibility 228 can indicate a sound-pressure level 222 at which a tone becomes audible to an average person. As illustrated, the threshold of audibility 228 varies across the frequency range 224.

Figure 2C:
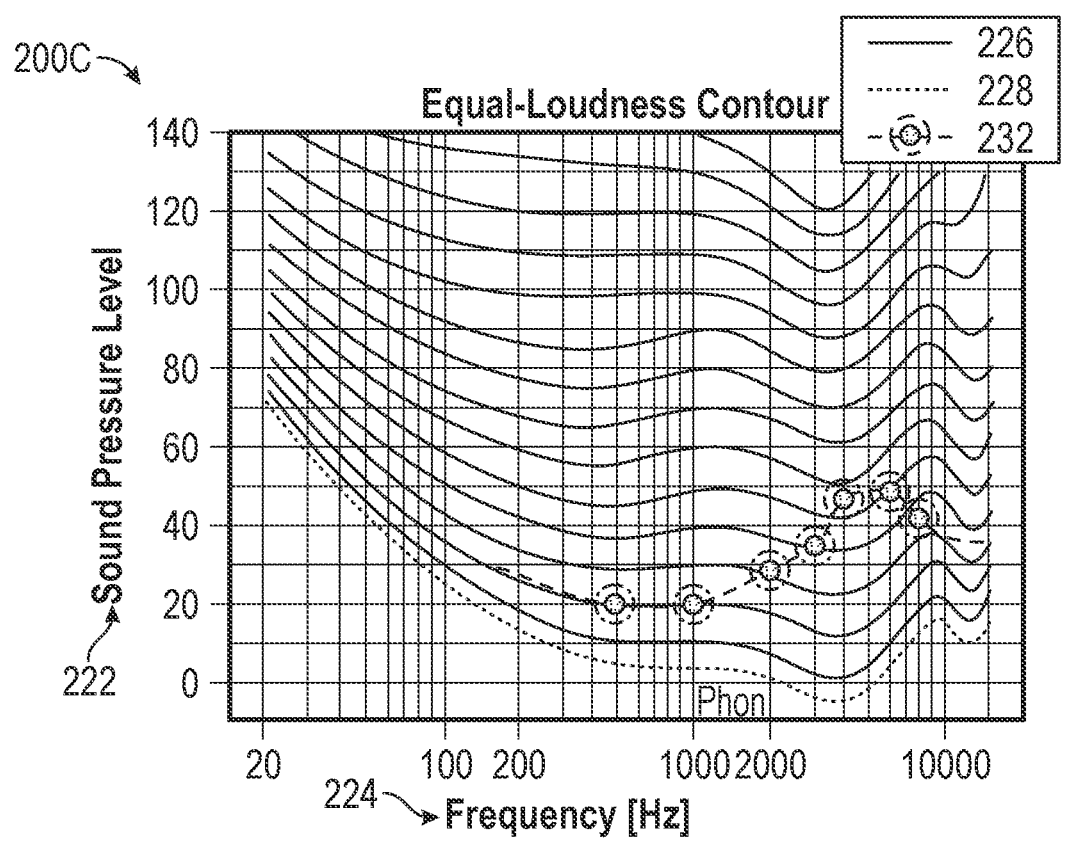
FIG. 2C illustrates an example chart of equal-loudness contours for an average person and audiometric information of a user.

FIG. 2C illustrates an example chart 200C of an equal loudness contour including audiometric information 232 from a left ear of a user. The audiometric information 232 can be generated by, for example, an auricular device 100 as described herein. In some examples, audiometric information 232 can be the same and/or similar to information represented in the audiogram data of a left ear 204 of FIG. 2A. Chart 200C can include the same and/or similar information as chart 200B (e.g., sound-pressure level 222, frequency range 224, contours 226, and/or a threshold of audibility 228, and/or the like).

As depicted in chart 200C, the audiometric information 232 can be included with contours 226. In some implementations, a processor 102 can generate a plurality of transfer functions as part of one or more hearing profiles based on the audiometric information 232 and/or contours 226. For example, processor 102 can generate a hearing profile that modifies a received acoustic signal based on the audiometric information 232 (e.g., amplifies an acoustic signal that is lower than the audiometric information 232 and/or based on equal-loudness contours 226).

Figure 2D:
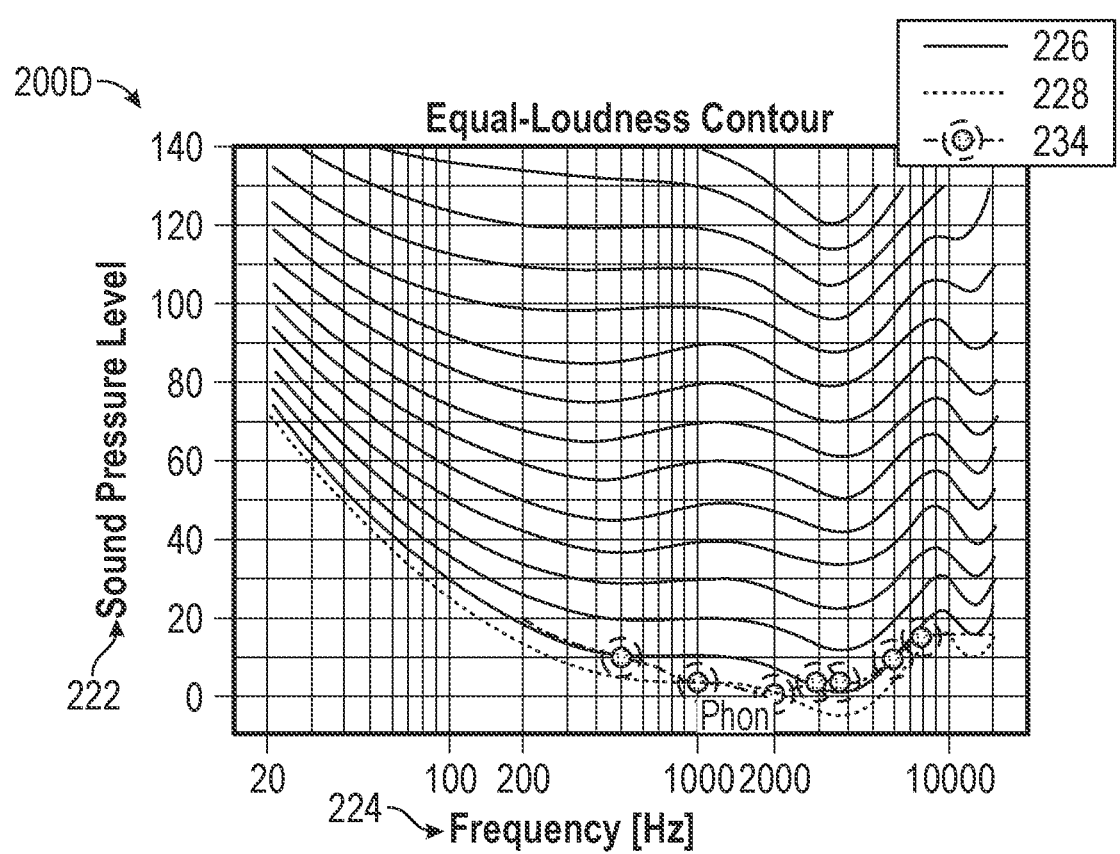
FIG. 2D illustrates an example chart of equal-loudness contours for an average person and audiometric information of a user.

FIG. 2D illustrates an example chart 200D of an equal loudness contour including audiometric information 234 of a user's right ear. The audiometric information 234 can be generated by, for example, an auricular device 100 as described herein. In some examples, audiometric information 234 can be the same and/or similar to information represented in the audiogram data of a right ear 202 of FIG. 2A. Chart 200D can include the same and/or similar information as chart 200B (e.g., sound-pressure level 222, frequency range 224, contours 226, and/or a threshold of audibility 228, and/or the like).

As depicted in chart 200D, the audiometric information 234 of a right ear can be included with contours 226. In some implementations, a processor 102 can generate a plurality of transfer functions as part of one or more hearing profiles based on the audiometric information 234 and/or contours 226. For example, processor 102 can generate a hearing profile that modifies a received acoustic signal based on the audiometric information 234 of a right ear (e.g., amplifies an acoustic signal that is lower than the audiometric information 234 and/or based on equal-loudness contours 226).

Figure 2E:
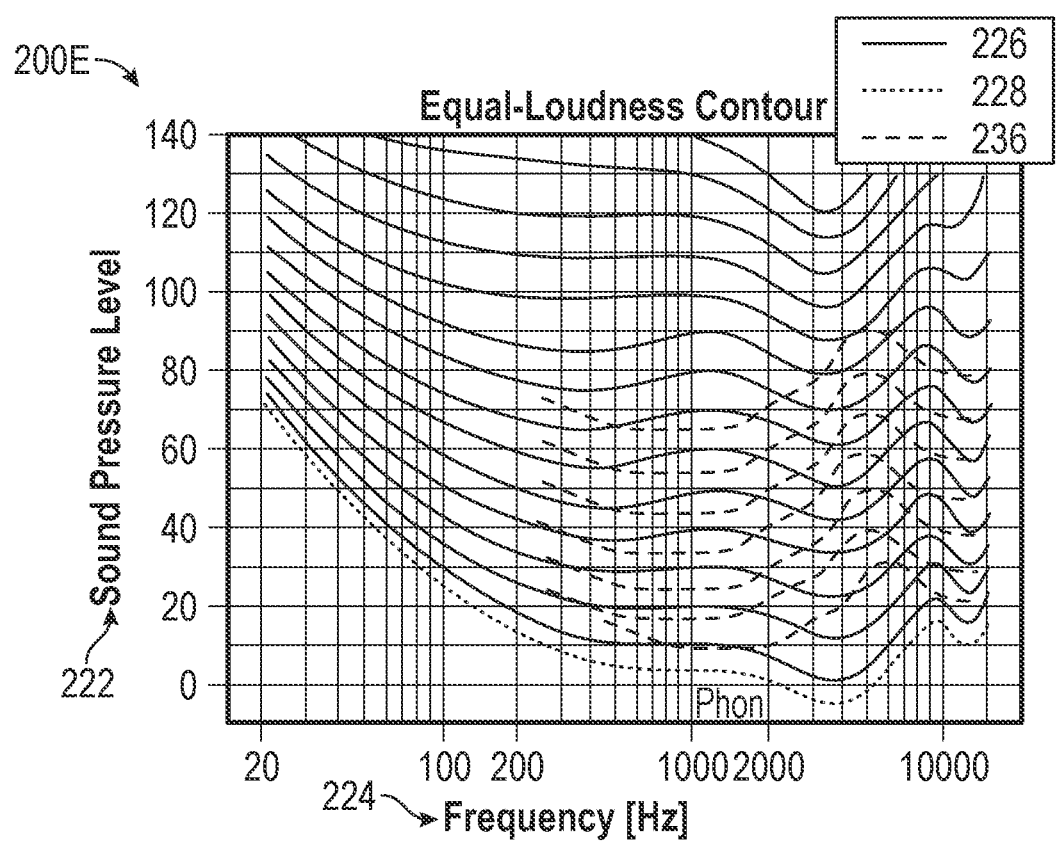
FIG. 2E illustrates an example chart of an equal-loudness contours for an average person and transfer functions of a user's hearing profile.

FIG. 2E illustrates an example chart 200E depicting example transfer functions 236 to enhance a user's listening experience. Chart 200E can include the same and/or similar information as chart 200B (e.g., sound-pressure level 222, frequency range 224, contours 226, and/or a threshold of audibility 228, and/or the like). In some implementations, processor 102 can generate transfer functions 236 based on the results of a user's hearing test. Advantageously, an auricular device 100 (e.g., processor 102) can generate and apply transfer functions 236 as part of a user's hearing profile, to modify an acoustic signal such that a user perceives a sound similar to that of the average person (e.g., according to the equal-loudness contours 226).

As illustrated, chart 200E includes a plurality of transfer functions 236. The plurality of transfer functions 236 can be created by one or more hearing tests. For example, an auricular device 100 of FIG. 1C can determine a hearing profile of a user based on a measured response including an otoacoustic emission (OAE), an auditory evoked potential (AEP), an acoustic reflex, and/or the like.

As described above, OAE is a low-level sound emitted by the cochlea either spontaneously or evoked by an auditory stimulus. AEP is a type of EEG signal emanated from the brain through the scalp in response to an acoustic stimulus. Auricular device 100 can measure any AEP, such as auditory brainstem response, mild latency response, cortical response, acoustic change complex, auditory steady state response, complex auditory brainstem response electrocochleography, cochlear microphonic, or cochlear neurophonic AEP. The acoustic reflex (also known as the stapedius reflex, middle-ear muscles (MEM) reflex, attenuation reflex, or auditory reflex) is an involuntary muscle contraction that occurs in the middle ear in response to high-intensity sound stimuli or when the person starts to vocalize.

After a user's measured hearing response is determined based on a hearing test, an auricular device 100 can create a plurality of transfer functions 236 associated with a user's hearing profile and/or one or more contours 226 associated with an average person's perception of sound. The plurality of transfer functions 236 and/or contours 226 can modify an acoustic signal in varying amounts based on a frequency and/or sound-pressure level 222 of the acoustic signal.

For example, an auricular device 100 can receive an acoustic signal having a frequency within the frequency range 224 and within the sound-pressure level 222 as represented in FIG. 2E. The auricular device 100 can determine an associated phon for the first frequency based on one or more contours 226 (e.g., a sound-pressure level of 60 dB at 100 Hz has a phon of approximately 50). Once the auricular device 100 determines an approximate phon for the first frequency, the auricular device 100 can determine and/or apply a transfer function 236 to the acoustic signal. An auricular device 100 can apply a transfer function 236 to modify the acoustic signal such that a user perceives the modified acoustic signal as if the user had a hearing profile represented by contours 226. As an illustrative example and with reference to chart 200E, an acoustic signal can be received by the auricular device. The received acoustic signal can have a frequency of approximately 4,000 Hz and a sound-pressure level of approximately 35 dB. Thus, according to chart 200E, the received acoustic signal has a phon of approximately 40 (e.g, by identifying at least one contour intersecting a point at 36 db and 4,000 Hz, and translating the contour to a phon). To modify the acoustic signal such that a user perceives the acoustic signal the same and/or similar to a person with average hearing (e.g., that of the contours 226), the auricular device can apply one or more transfer functions based on a user's hearing test, such that the modified acoustic signal is emitted to the user at approximately 65 dB. Thus, an equal-loudness hearing profile can apply both contours 226 and/or transfer functions 236 to modify an acoustic signal such that a user perceives the acoustic signal similar to and/or the same as an average person.

V. Example Routine for Applying an Equal-Loudness Hearing Profile

Figure 3:
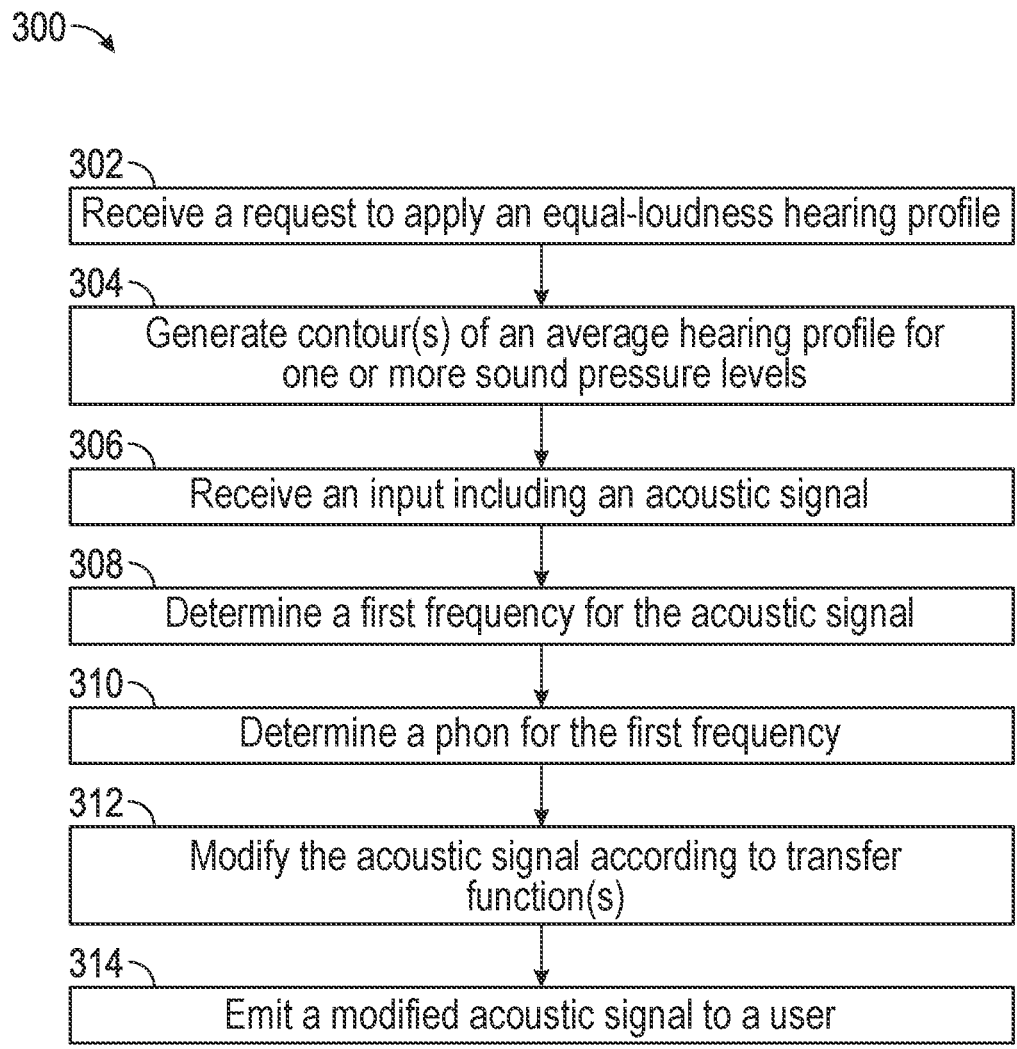
FIG. 3 is an example flowchart of an equal-loudness hearing profile routine illustratively implemented by an auricular device.

FIG. 3 is an example flowchart of an equal-loudness hearing profile routine 300 implemented by an auricular device 100 according to one embodiment. The blocks of the flow charts illustrate example implementations, and in various other implementations various blocks may be rearranged, optional, and/or omitted, and/or additional block may be added. As an example, an auricular device 100 including a processor 102, microphones 122, speakers 124, storage device 104, communication module 106, and/or power source 110 (among other components) of FIG. 1C can be configured to execute the equal-loudness hearing profile routine 300. Routine 300 can create a hearing profile and/or modify one or more acoustic signals to enhance a user's hearing. For example, an auricular device 100 can generate a hearing profile and/or one or more aspects of a hearing profile via OAE, AEP, and/or acoustic reflex as described herein. The hearing profile can be used by an auricular device 100 to apply one or more transfer functions to an acoustic signal received by microphones 122, to enable a user to hear the acoustic signal the same as and/or similar to a normal hearing profile (e.g., modify the acoustic signal according to one or more equal-loudness contours and/or hearing transfer functions). The example routine 300 begins at block 302.

At block 302, an auricular device 100 can receive a request to apply an equal-loudness hearing profile. An auricular device 100 can receive a request from, for example, an external device (e.g., interchangeably referred to herein as a separate computing device and/or the like), and/or a user as described herein. Additionally, the auricular device 100 can determine whether to apply an equal-loudness hearing profile based on computer executable instructions stored on, for example storage device 104. Further, an auricular device 100 can receive a request in response to an auricular device 100 entering one or more hearing modes as described herein. Alternatively, a request to apply an equal-loudness hearing profile can be received by the auricular device 100 along with one or more hearing profiles of a user. For example, an auricular device 100 can receive from a separate computing device and/or the like, a request to apply an equal-loudness hearing profile and/or another hearing profile to the auricular device 100. Further, a hearing profile can include, for example, one or more transfer functions associated with modifying an acoustic signal.

At block 304, the auricular device 100 can generate contour(s) of an average hearing profile for one or more sound-pressure levels. In some examples, the auricular device 100 can create contours similar to the contours 226 of FIGS. 2B-2E (e.g., as set forth in the international standard ISO 226:2003 entitled "Acoustics—Normal equal-loudness level contours"). In some examples, the auricular device 100 can generate one or more contours representing another person's hearing profile. Contours 226 of FIGS. 2B-2E can represent the relationship between sound frequency and the perceived loudness or sensitivity of a human ear for a normal person's hearing. Contours 226 illustrate the varying sensitivity of human auditory system to different frequencies at constant perceived loudness levels as mentioned herein.

At block 306, an auricular device 100 can receive an input including an acoustic signal. For example, an auricular device 100 can receive an acoustic signal via microphones 122. Microphones 122 can transmit the received acoustic signal to a processor 102 where the processor 102 can modify the acoustic signal as described below. In some examples, an auricular device 100 can receive an acoustic signal from a separate computing device as described herein (e.g., via communication module 106).

At block 308, an auricular device 100 can determine a first frequency for the acoustic signal. As discussed with reference to FIGS. 2B-2E, an auricular device 100 (e.g., via processor 102) can determine a first frequency of an acoustic signal within a frequency range of, for example, 0-10,000 Hz. In some examples, the auricular device 100 can determine a first frequency within a different frequency range than the frequency range as illustrated in FIGS. 2B-2E. In some examples, the first frequency can be 10 Hz, 100 Hz, 1k Hz, 5k Hz, 10k Hz, and/or the like. In some examples, the first frequency can include a bandwidth (e.g., 4.0-4.1 KHz, 1 kHz+/−10 Hz, and/or the like). As mentioned herein, an auricular device 100 can determine a first frequency of an acoustic signal in order to modify the acoustic signal at the determined first frequency. Additionally and/or optionally, the auricular device 100 can determine a first sound-pressure level associated with the first frequency, for the acoustic signal.

At block 310, the auricular device 100 can determine a phon for the first frequency. The auricular device 100 can determine a first phon based on, for example, determining a sound-pressure level of a received acoustic signal and by applying a determined and/or received hearing profile for the user. In some examples, the hearing profile can be the same and/or similar to equal-loudness contours 226 of FIGS. 2B-2E. In some examples, the loudness of a received acoustic signal may be measured in units of phon. As mentioned above, the loudness of a given sound in phon is the sound-pressure level of a 1 kHz tone having a subjective loudness equal to that of the acoustic signal. As an illustrative example, an auricular device 100 can determine, based on FIGS. 2B-2E, that an associated phon for a first frequency at 100 Hz having a sound-pressure level of 60 dB, has a phon of approximately 50.

At block 312, the auricular device 100 can modify the acoustic signal according to a transfer function(s). In some examples, a transfer function (e.g., transfer function 236 of FIG. 2E) can be associated with one or more hearing profiles. In some examples, a transfer function 236 can modify an acoustic signal in varying amounts based on a frequency and/or sound-pressure level of the acoustic signal. In some examples, transfer functions 236 can modify an acoustic signal such that a user perceives the modified acoustic signal according to equal-loudness contours 226.

Transfer functions 236 can be used by the auricular device 100 to modify the acoustic signal such that a user perceives the modified acoustic signal as if the user had a hearing profile represented by contours 226. As an illustrative example and with continued reference to FIG. 2E, an acoustic signal with a frequency of approximately 4,000 Hz and a sound-pressure level of approximately 35 dB has a phon of approximately 40. To modify the acoustic signal such that a user perceives the acoustic signal the same and/or similar to a person with normal hearing (e.g., that of the contours 226), the auricular device can apply transfer functions 236 such that the modified acoustic signal is emitted to the user at approximately 65 dB. In some examples, the auricular device 100 can modify a broad range of frequencies based on contours 226 and/or transfer functions 236.

At block 314, the auricular device 100 can emit a modified acoustic signal to a user. A modified acoustic signal can have a sound-pressure level determined by, for example, processor 102 based on a hearing profile. In some examples, a processor 102 can transmit a modified acoustic signal to speakers 124, wherein the speakers 124 emits the modified acoustic signal to the user. In some examples, the modified acoustic signal is emitted at a determined sound-pressure level based on transfer functions 236 as described herein. As an illustrative example and with reference to FIG. 2E, the auricular device 100 can emit a modified acoustic signal at 65 dB such that the user perceives the signal as having a sound-pressure level of approximately 35 dB. After the auricular device 100 emits a modified acoustic signal the routine 300 ends.

Figure 4B:
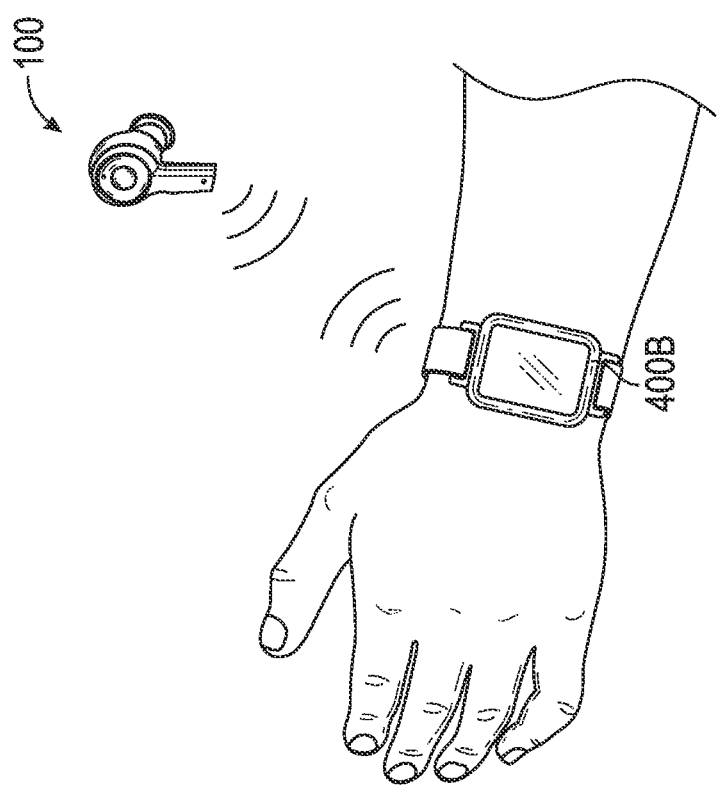
Figure 4C:
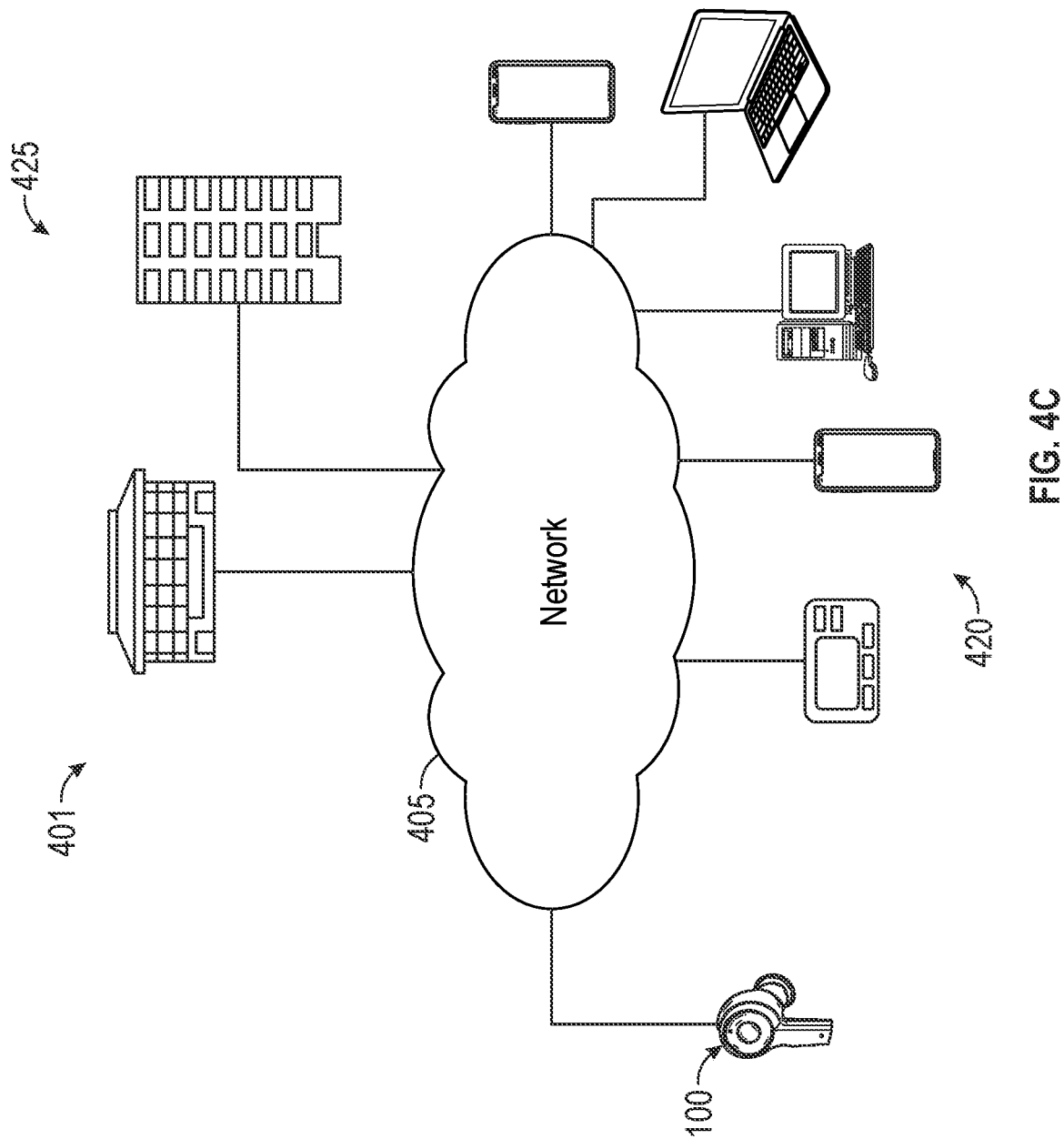

VI. Example Aspects of an Operating Environments for an Auricular Device Embodiments FIGS. 4A-4C illustrate interactions between an auricular device 100 and various devices and/or systems. With reference to FIGS. 4A-4B, the auricular device 100 can communicate, for example, wirelessly, with a mobile device 400A and/or watch 400B among other types of devices (for example, tablet, PDA, laptop computer, patient monitor, and/or the like). Communication between mobile device 400A and/or watch 400B and auricular device 100 can be via a wireless connection, utilizing any of the wireless communication protocols discussed herein and/or the like. An auricular device 100 can be configured to transmit physiological parameters, motion data, location data, and/or any other data as discussed herein to mobile device 400A and/or watch 400B. An auricular device 100 can be configured to receive instructions and/or information from a mobile device 400A and/or watch 400B. For example, instructions and/or information can be associated with an audio playback mode, hearing aid mode, an enhanced hearing mode, and/or a hearing profile as described above. A watch 400B can be configured to measure and/or monitor one or more physiological parameters of a user (e.g., oxygen saturation, pulse rate, heart rate, among others) and/or other information of a user (e.g., location and/or movement data determined from accelerometer(s), gyroscope(s), magnetometer(s) of the watch 400B).

FIG. 4C illustrates an example implementation of a communication environment 401 in which an auricular device 100 can communicate with various computing devices and services over a network 405. Although various devices and services are illustrated, the auricular device 100 can be configured to communicate with a subset of the illustrated devices and services, and in some implementations, the auricular device 100 can be configured to communicate with only one of the illustrated devices and services.

An auricular device 100 can communicate over a network 405 with at least one of a home/mobile clinician device 420, and/or hospital and care facilities 425. The example network 405 can be a local area network (LAN), wide area network (WAN), the Internet, an intranet, cellular communications network, satellite communications network, and/or combinations of the same and/or the like. A home/mobile clinician device 420 can include at least one of laptops, desktops, servers, workstations, tablets, wireless handheld devices such as cell phones, smart phones, smart watches, personal digital assistants and wireless pagers, combinations of the same and/or the like.

Alternatively and/or additionally, the auricular device 100 can communicate with patient databases of hospitals and care facilities 425 over the network 405. Hospital and care facilities 425 can include a server such as hospital server, a medical records database, and/or an individual physician notification such as an email, text message, and/or phone call. An auricular device 100 can transmit hearing profile data, parameter data, trend data, medical records data, alerts and/or alarms to the home/mobile clinician device 420 and/or hospital and care facilities 425. Additionally, the auricular device 100 can cause the communication module 106 to transmit an emergency notification (e.g., a phone call and/or text message) via network 405 to any of the devices of FIG. 4C if one or more of the physiological sensors of the auricular device 100 determines that the user may be experiencing a health-related event, such as for example, an opioid overdose.

In an example implementation, the auricular device 100 can transmit hearing profile data via network 405. An auricular device may transmit hearing profile data at a predetermined frequency (e.g., weekly, monthly, and/or annually), to at least one of a home/mobile clinician device 420 and/or hospital and care facilities 425 such that a physician can periodically monitor a user's hearing profile data and determine whether changes to a user's hearing occurred over time. In another example implementation, a user can interact with the auricular device 100 to cause the auricular device 100 to transmit hearing profile data to a home/mobile clinician device 420 via network 405.

Additionally, and/or alternatively, the auricular device 100 can be configured to measure the hearing loss of a user by conducting one or more hearing tests (e.g., audiogram test and/or equal/loudness test), at a predetermined frequency (e.g., weekly, monthly, and/or annually). Further, the auricular device 100 may automatically compute the measured hearing loss of the user based on the one or more hearing tests and transmit the measured hearing loss data of a user to one or more of a home/mobile clinician device 420, a hospital and care facilities 425, and/or a separate computing device such as a smartphone. An auricular device 100 may automatically determine whether a user may be experiencing hearing loss by, for example, requesting the user conduct one or more hearing tests and comparing the results of the one or more hearing tests against the results of previously completed hearing tests, and/or comparing the results of the hearing test with a threshold value.

In an additional implementation, the auricular device 100 may transmit, to a separate computing device such as a smartphone, a request for the user to conduct a hearing test. Additionally, and/or alternatively, the auricular device 100 may receive a request from a user and/or healthcare professionals to conduct a hearing test, via a home/mobile clinician device 420, a hospital and care facilities 425, and/or a separate computing device such as a smartphone. The results of the user's hearing test may, for example, be transmitted from the auricular device 100 to a home/mobile clinician device 420, a hospital and care facilities 425, and/or a separate computing device such as the user's smartphone, such that the hearing test data may be accessible by the user and/or medical personnel.

In a further implementation, the auricular device 100 incudes one or more sensors as described herein, such as an oximetry sensor 112, temperature sensors 118, and/or other sensors 120 and communicates a user's psychological information to at least one of a home/mobile clinician device 420 and/or hospital and care facilities 425 such that a physician can monitor a user's physiological information.

Although the present disclosure may describe implementations and/or use of the auricular device 100 within the context of an ear of the user, it is to be understood that two of such auricular devices 100 can be secured to two ears of the user (one per each ear) and can each be utilized to carry out any of the functions and/or operations described herein with respect to auricular device 100. By way of non-limiting example, while FIGS. 4A-lustrate an auricular device 100, it is to be understood that two of such auricular devices 100 may be employed to carry out any of the functions and/or operations described herein with respect to auricular device 100 and/or to interact with any of the devices and/or systems described herein.

Any of the auricular devices described herein and/or components and/or features of the auricular devices described herein can be integrated into a wearable device that secures to another portion of a user's body. For example, any of the components and/or features of the auricular devices described herein can be integrated into a wearable device that can be secured to a head, chest, neck, leg, ankle, wrist, and/or another portion of the body. As another example, any of the components and/or features of the auricular devices described herein can be integrated into glasses and/or sunglasses that a user can wear. As another example, any of the components and/or features of the auricular devices described herein can be integrated into a device (for example, a band) that that a user can wear around their neck.

In some implementations, an auricular device 100 can be utilized to monitor characteristic(s) and/or quality of sleep of a user. As discussed elsewhere herein, an auricular device 100 can be configured to communicate (for example wirelessly communicate) with separate devices, such as a mobile phone. In some implementations, an auricular device 100 may be configured for communication with a separate computing device (for example, mobile phone) that may be configured to execute an application (e.g., software application, web and/or mobile application, etc.) that can execute commands to enable the separate computing device to determine one or more characteristics and/or quality of sleep of a user based on one or more physiological parameters determined by the auricular device 100 and transmitted to the separate computing device. For example, as discussed elsewhere herein, the auricular device 100 can be configured to determine oxygen saturation, pulse rate, and/or respiration rate of a user and transmit such physiological parameters to the separate computing device for determination of characteristics and/or quality of the user's sleep.

In some implementations, an auricular device 100 can be similar and/or identical to and/or incorporate any of the features and/or sensors described with respect to any of the devices described and/or illustrated in U.S. Pub. No. 2021/0383011, published Dec. 9, 2021, titled "Headphones with Timing Capability and Enhanced Security," which is incorporated by reference herein its entirety and forms part of the present disclosure.

VII. Terminology

Although this invention has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and subcombinations of the features and aspects can be made and still fall within the scope of the invention. Furthermore, the systems and devices described above need not include all of the modules and functions described in the preferred embodiments.

Conditional language used herein, such as, among others, "can," "could," "might," "may," "e.g.," and the like, unless specifically stated otherwise, or otherwise understood within the context as used, is generally intended to convey that certain features, elements, and/or steps are optional. Thus, such conditional language is not generally intended to imply that features, elements, and/or steps are in any way required or that one or more embodiments necessarily include logic for deciding, with or without other input or prompting, whether these features, elements, and/or steps are included or are to be always performed. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 10 degrees, 5 degrees, 3 degrees, or 1 degree. As another example, in certain embodiments, the terms "generally perpendicular" and "substantially perpendicular" refer to a value, amount, or characteristic that departs from exactly perpendicular by less than or equal to 10 degrees, 5 degrees, 3 degrees, or 1 degree.

Although certain embodiments and examples have been described herein, it will be understood by those skilled in the art that many aspects of the systems and devices shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

Any methods disclosed herein need not be performed in the order recited. The methods disclosed herein may include certain actions taken by a practitioner; however, they can also include any third-party instruction of those actions, either expressly or by implication.

The methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. The computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (for example, not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

Various illustrative logical blocks, modules, routines, and algorithm steps that may be described in connection with the disclosure herein can be implemented as electronic hardware (e.g., ASICs or FPGA devices), computer software that runs on general purpose computer hardware, or combinations of both. Various illustrative components, blocks, and steps may be described herein generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, various illustrative logical blocks and modules that may be described in connection with the disclosure herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. A processor can include an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of any method, process, routine, or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above detailed description has shown, described, and pointed out novel features, it can be understood that various omissions, substitutions, and changes in the form and details of the devices or algorithms illustrated can be made without departing from the spirit of the disclosure. As can be recognized, certain portions of the description herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a storage device, configured to store computer-executable instructions; and
   an ear-bud configured to be positioned within an ear canal of a user, the ear-bud comprising:
      a speaker configured to emit audio in a range of audible frequencies;
      a microphone configured to generate audio data responsive to detecting audio; and
      one or more processors in communication with the storage device, wherein the computer-executable instructions, when executed by the one or more processors, cause the one or more processors to:
         obtain a user hearing profile, the user hearing profile including a plurality of transfer functions, the plurality of transfer functions corresponding to a user's perception of loudness for a range of audible frequencies and a range of sound-pressure levels;
         obtain an equal-loudness hearing profile including a plurality of contours corresponding to an average person's perception of loudness for the range of audible frequencies and the range of sound-pressure levels;
         receive audio data from the microphone;
         determine a first frequency and a first sound-pressure level for the audio data, wherein the first frequency and the first sound-pressure level are associated with at least one contour of the equal-loudness hearing profile;
         estimate a phon for the first frequency and the first sound-pressure level based on the at least one contour;

in response to estimating the phon, determine at least one transfer function associated with the user hearing profile;

compute a second sound-pressure level based on the at least one transfer function and the first frequency;

generate a second audio data based on the first sound-pressure level, the second sound-pressure level, and the first frequency; and cause the speaker to emit the second audio data within the ear canal of the user, such that the user perceives the audio data as if the user has normal hearing.

2. The system of claim 1, wherein the equal-loudness hearing profile is obtained from an external device.

3. The system of claim 1, wherein the range of audible frequencies is 0 to 20,000 Hz.

4. The system of claim 1, wherein the range of sound-pressure levels is 0 to 120 decibels.

5. The system of claim 1, wherein the user hearing profile is obtained based on an otoacoustic emission, and auditory evoked potential, or an acoustic reflex.

6. The system of claim 1, wherein at least one transfer function of the user hearing profile is associated with a user's threshold of audibility.

7. The system of claim 1, wherein the audio data is received from an external device.

8. The system of claim 1, wherein the user hearing profile is obtained from the storage device.

9. An ear-bud configured to be positioned within an ear canal of a user, the ear-bud comprising:

a speaker configured to emit audio in a range of audible frequencies;

a microphone configured to generate audio data responsive to detecting audio;

a storage device, configured to store computer-executable instructions; and one or more processors in communication with the storage device, wherein the computer-executable instructions, when executed by the one or more processors, cause the one or more processors to:

obtain a user hearing profile, the user hearing profile including a plurality of transfer functions, the plurality of transfer functions corresponding to a user's perception of loudness for the range of audible frequencies and a range of sound-pressure levels;

obtain an equal-loudness hearing profile including a plurality of contours corresponding to an average person's perception of loudness for the range of audible frequencies and the range of sound-pressure levels;

receive audio data from the microphone;

determine a first frequency and a first sound-pressure level for the audio data, wherein the first frequency and the first sound-pressure level are associated with at least one contour of the equal-loudness hearing profile;

estimate a phon for the first frequency and the first sound-pressure level based on the at least one contour;

in response to estimating the phon, determine at least one transfer function associated with the user hearing profile;

compute a second sound-pressure level based on the at least one transfer function and the first frequency;

generate a second audio data based on the first sound-pressure level, the second sound-pressure level, and the first frequency; and cause the speaker to emit the second audio data within the ear canal of the user, such that the user perceives the audio data as if the user has normal hearing.

10. The ear-bud of claim 9, wherein the equal-loudness hearing profile is obtained from an external device.

11. The ear-bud of claim 9, wherein the range of audible frequencies is 0 to 20,000 Hz.

12. The ear-bud of claim 9, wherein the range of sound-pressure levels is 0 to 120 decibels.

13. The ear-bud of claim 9, wherein the user hearing profile is obtained based on an otoacoustic emission, and auditory evoked potential, or an acoustic reflex.

14. The ear-bud of claim 9, wherein at least one transfer function of the user hearing profile is associated with a user's threshold of audibility.

15. The ear-bud of claim 9, wherein the audio data is received from an external device.

16. The ear-bud of claim 9, wherein the user hearing profile is obtained from the storage device.

17. A method comprising:

obtaining a user hearing profile, the user hearing profile including a plurality of transfer functions, the plurality of transfer functions corresponding to a user's perception of loudness for a range of audible frequencies and a range of sound-pressure levels;

obtaining an equal-loudness hearing profile including a plurality of contours corresponding to an average person's perception of loudness for the range of audible frequencies and the range of sound-pressure levels;

receiving audio data from a microphone;

determining a first frequency and a first sound-pressure level for the audio data, wherein the first frequency and the first sound-pressure level are associated with at least one contour of the equal-loudness hearing profile;

estimating a phon for the first frequency and the first sound-pressure level based on the at least one contour;

in response to estimating the phon, determining at least one transfer function associated with the user hearing profile;

computing a second sound-pressure level based on the at least one transfer function and the first frequency;

generating a second audio data based on the first sound-pressure level, the second sound-pressure level, and the first frequency; and causing a speaker to emit the second audio data within an ear canal of a user, such that the user perceives the audio data as if the user has normal hearing.

18. The method of claim 17, wherein the equal-loudness hearing profile is obtained from an external device.

19. The method of claim 17, wherein the range of audible frequencies is 0 to 20,000 Hz and the range of sound-pressure levels is 0 to 120 decibels.

20. The method of claim 17, wherein the user hearing profile is obtained based on an otoacoustic emission, and auditory evoked potential, or an acoustic reflex.

* * * * *